US011850851B2

(12) United States Patent
Visser et al.

(10) Patent No.: US 11,850,851 B2
(45) Date of Patent: Dec. 26, 2023

(54) PROCESS AND DEVICE FOR IN-AIR PRODUCTION OF SINGLE DROPLETS, COMPOUND DROPLETS, AND SHAPE-CONTROLLED (COMPOUND) PARTICLES OR FIBERS

(71) Applicant: IamFluidics Holding B.V., Enschede (NL)

(72) Inventors: Claas Willem Visser, Enschede (NL); Tom Kamperman, Enschede (NL); Hermanus Bernardus Johannes Karperien, Enschede (NL); Detlef Lohse, Enschede (NL)

(73) Assignee: IamFluidics Holding B.V., Enschede (NL)

( * ) Notice: Subject to any disclaimer, the term of this patent is extended or adjusted under 35 U.S.C. 154(b) by 3 days.

(21) Appl. No.: 17/545,304

(22) Filed: Dec. 8, 2021

(65) Prior Publication Data

US 2022/0161554 A1 May 26, 2022

Related U.S. Application Data

(62) Division of application No. 16/088,116, filed as application No. PCT/EP2017/057392 on Mar. 29, 2017, now Pat. No. 11,198,293.

(30) Foreign Application Priority Data

Mar. 30, 2016 (EP) ..................................... 16163060
Mar. 31, 2016 (EP) ..................................... 16163461
Jul. 28, 2016 (EP) ..................................... 16181763

(51) Int. Cl.
*B41J 2/21* (2006.01)
*B41J 2/14* (2006.01)
(Continued)

(52) U.S. Cl.
CPC ................. *B41J 2/14* (2013.01); *B01J 13/08* (2013.01); *B01J 13/14* (2013.01); *B41J 2/211* (2013.01)

(58) Field of Classification Search
CPC ....................................................... B41J 2/211
See application file for complete search history.

(56) References Cited

U.S. PATENT DOCUMENTS

| 4,341,310 A | 7/1982 | Sangiovanni et al. |
| 5,230,735 A | 7/1993 | Murata et al. |
(Continued)

FOREIGN PATENT DOCUMENTS

| CN | 101896351 A | 11/2010 |
| DE | 10 2014 104341 A1 | 10/2015 |
(Continued)

OTHER PUBLICATIONS

Blanchette et al., "The influence of surface tension gradients on drop coalescence." Physics of Fluids, American Institute of Physics (AIP), 2009, 21, 072107, 11 paqes.
(Continued)

*Primary Examiner* — Scott A Richmond
(74) *Attorney, Agent, or Firm* — Occhiuti & Rohlicek LLP

(57) ABSTRACT

A production process and a related device comprises a formation process comprising: contacting a first liquid material and a second liquid material with each other at a contact point in a gas atmosphere, wherein at the contact point at least one of the first liquid material and the second liquid material is provided as a liquid jet propagating in a direction, to provide at the contact point a third jet of a coalesced third material propagating in a third direction.

16 Claims, 7 Drawing Sheets

(51) Int. Cl.
*B01J 13/08* (2006.01)
*B01J 13/14* (2006.01)

(56) References Cited

U.S. PATENT DOCUMENTS

| | | | |
|---|---|---|---|
| 5,736,074 | A | 4/1998 | Hayes et al. |
| 5,889,538 | A * | 3/1999 | Kishimoto ............... B41J 2/211 |
| | | | 347/43 |
| 6,086,196 | A | 7/2000 | Ando et al. |
| 6,200,013 | B1 | 3/2001 | Takeuchi et al. |
| 9,364,803 | B2 | 6/2016 | Yurkovetsky et al. |
| 2003/0153709 | A1* | 8/2003 | Marcarian ............... B01F 33/30 |
| | | | 526/318.4 |
| 2007/0211098 | A1 | 9/2007 | Pechtl |
| 2008/0309690 | A1 | 12/2008 | Mantell et al. |
| 2009/0318586 | A1 | 12/2009 | Teshima et al. |
| 2011/0050812 | A1 | 3/2011 | Boot et al. |
| 2012/0080544 | A1 | 4/2012 | Shinoda |
| 2012/0107498 | A1 | 5/2012 | Houben et al. |
| 2015/0035895 | A1* | 2/2015 | Kubota ................ C09D 11/322 |
| | | | 524/110 |
| 2016/0325265 | A1 | 11/2016 | Zhu et al. |
| 2019/0193037 | A1* | 6/2019 | Seaman ................ A61P 27/02 |

FOREIGN PATENT DOCUMENTS

| | | | |
|---|---|---|---|
| EP | 2 020 261 | A1 | 2/2009 |
| EP | 2 058 131 | A1 | 5/2009 |
| EP | 2 213 366 | A1 | 8/2010 |
| GB | 2551944 | A * | 12/2015 |
| WO | 2006/122561 | A1 | 11/2006 |
| WO | 2008/058548 | A1 | 5/2008 |
| WO | 2009/080893 | A1 | 7/2009 |
| WO | 2011/116763 | A1 | 9/2011 |
| WO | 2015/107193 | A1 | 7/2015 |
| WO | 2015/0191641 | A1 | 12/2015 |
| WO | 2016096054 | A1 | 6/2016 |

OTHER PUBLICATIONS

Chen, "Diesel-diesel and diesel-ethanol drop collisions." Applied Thermal Engineering 27, 2007, pp. 604-610.
Chen et al., "Collision between immiscible drops with large surface tension difference: diesel oil and water." Experiments in Fluids, 2006, 41, pp. 453-461.
Chen et al., "Collisions of a string of water drops on a water jet of equal diameter." Experimental Thermal and Fluid Science 31, 2006, pp. 75-81.
Focke et al., "Collision between high and low viscosity droplets: Direct Numerical Simulations and experiments." International Journal of Multiphase Flow 56, 2013, pp. 81-92.
Li et al., "Dynamics of bouncing-versus-merging response in jet collision." Physical Review E 92, 023024, 2015, 6 pages.
Blanchette, Simulation of Mixing within Drops due to Surface Tension Variations. Physical Review Letters, PRL 105, DD. 074501-1 to 074501-4, Aug. 2010.
Planchette, et al., "Colloids and Surfaces A: Physicochemical and Engineering Aspects." Colloids and Surfaces A: Physiocochem. Eng. Aspects 365, 2010, pp. 89-94.
Qian et al., "Regimes of coalescence and separation in droplet collision." J. Fluid Mech. 1997, vol. 331, pp. 59-80.
Erni, P. and Elabbadi, A., "Free Impinging Jet Microreactors: Controlling Reactive Flows via Surface Tension and Fluid Viscoelasticity," Langmuir 2013, 29, p. 7812-7824.

* cited by examiner

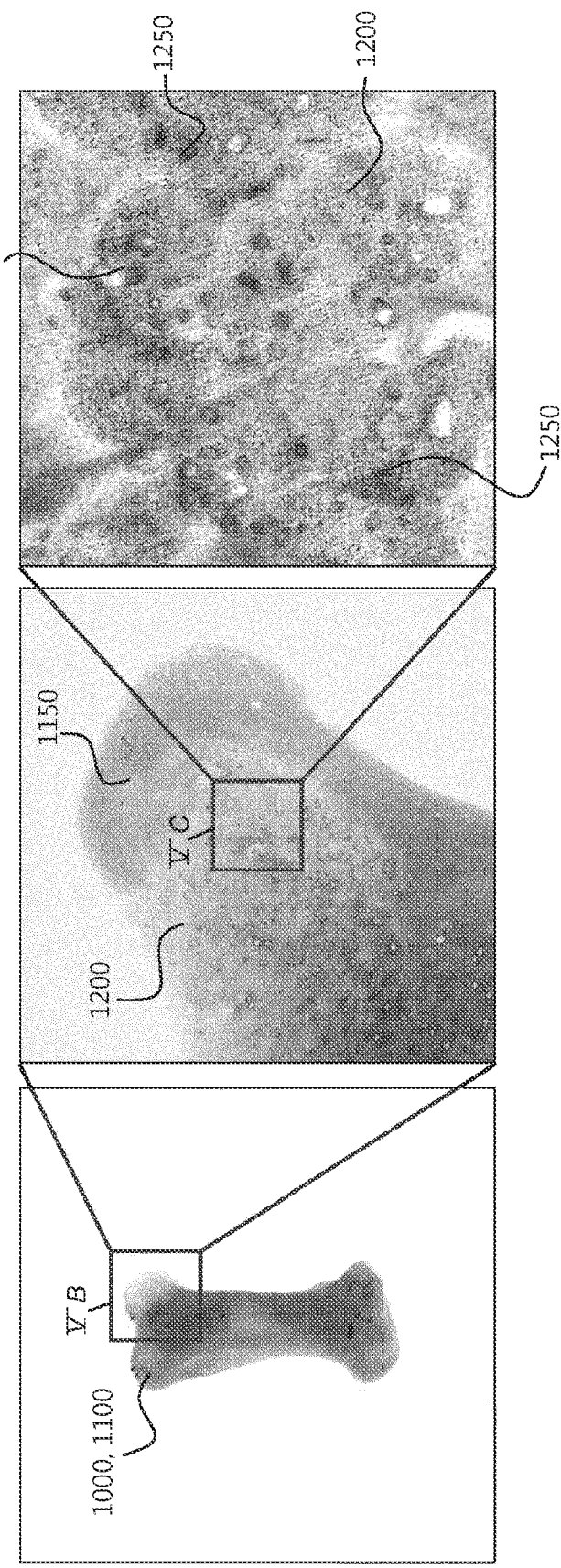

PROCESS AND DEVICE FOR IN-AIR PRODUCTION OF SINGLE DROPLETS, COMPOUND DROPLETS, AND SHAPE-CONTROLLED (COMPOUND) PARTICLES OR FIBERS

CROSS REFERENCE TO RELATED APPLICATIONS

This application is a divisional application of U.S. application Ser. No. 16/088,116 filed Sep. 25, 2018, which is a National Phase under 35 USC 371 of International Application No. PCT/EP2017/057392 filed on Mar. 29, 2017, which claims priority to European Application No. 16163060.3 filed Mar. 30, 2016, European Application No. 16163461.3, filed Mar. 31, 2016, and European Application No. 16181763.0 filed Jul. 28, 2016, the contents of which are hereby incorporated by reference in their entirety.

FIELD OF THE INVENTION

The invention relates to a process for the production of a material, such as a fibrous material or a particulate material (or a dispersed material). The invention further relates to device for executing such process. Yet further, the invention also relates to a product obtainable by such process and/or with such device.

BACKGROUND OF THE INVENTION

Particulate generation systems are known in the art. US 20120107498, for instance, describes a multi-component particle generating system that may include a first nozzle constructed to generate at least one isolated particle, and a second nozzle arranged to generate a generally uninterrupted fluid jet without breaking up. The first and second nozzles are arranged to have the isolated particle traverse the fluid jet from one side to the other side so as to combine the particle with fluid of the second fluid jet, for providing a multi component particle. A collector is arranged on the other side of the fluid jet by which the isolated particles can be captured after collision with the fluid jet. The system includes a modulator, for modulating the second fluid jet so as to provide an undulated jet having thicker and thinner portions.

WO2015/091641 relates to a method for producing polyamides by means of a spray nozzle arrangement for the collision of spray jets, comprising at least one spray nozzle forming a first spray jet having a first spray jet cross-sectional surface and a first spray jet longitudinal extension axis, and comprising a second spray jet forming a second spray jet having a second spray jet cross-sectional surface and a second spray jet longitudinal extension axis, wherein the first and second spray jets have a spray direction that is facing the gravitational field, and are arranged opposite one another such that in a spray direction facing the gravitational field, the formed spray jets collide in a collision area.

SUMMARY OF THE INVENTION

Today, additive manufacturing (AM, also known as 3D printing) enables fast and high-quality prototyping, production of lightweight metal parts, and construction of artificial human tissues. In most AM processes, a small amount of material is ejected and deposited to constitute a printed product. However, though liquids can be easily processed, only solids maintain their shape after deposition. Therefore, in order to accommodate the properties of different material groups, various AM techniques have been developed. For example, ink-jet printing is suitable for deposition of low-viscosity liquids, extrusion printing for medium-viscosity plastics and cell-containing hydrogels, and solids and pastes can be processed using laser transfer, where a focused laser pulse drives the ejection of a "voxel" (volume pixel) of from a thin film. However, these technologies not only pose severe trade-offs in terms of resolution and throughput, they also fail to integrate solid, soft, and liquid phases within a single 3D-printed product.

In contrast, microfluidics allows for in-line processing: to manipulate fluids after ejection from a nozzle but prior to their collection or analysis. Here, small quantities of liquid, solid, or gaseous material are merged, separated or even formed in channels on a chip, by optical, electronic, or mechanical manipulations. This versatility has resulted in tremendous progress and integration of research in engineering, physics, chemistry, biology, and healthcare. However, three key limitations affect widespread application of microfluidics devices. First, microfluidics chips are usually operated at flow rates in the order of 10 µl/min, which ensures optimal flow control and prevents excessive pressure build-up resulting in device damage, but which is too low for many practical purposes. Second, microfluidic "base units" (e.g. droplets, particles, and fibers) are typically produced using a separate low-viscosity coaxial flow to induce emulsification (in droplet microfluidics) or to prevent clogging (in continuous microfluidics). Therefore, one-step deposition of base units to form larger, shape-stable structures is hardly feasible. Even if this co-flow could be omitted, the liquid velocity at a microfluidic device exit would be too low to obtain jetting, which is the principle behind common printing technologies. Third, challenges regarding the design, manufacture, surface treatment and operation of microfluidic devices hamper their rapid prototyping and scaling, and therefore delay process optimization that could drive widespread application of microfluidic technologies.

Hence, it is an aspect of the invention to provide an alternative production process, which preferably further at least partly obviates one or more of above-described drawbacks, which may be relatively simple and/or which may be relatively easily implementable. Further, it is an objective of the invention to provide a device able to generate material in gas, i.e. in a gaseous atmosphere (especially including a low vacuum). The present invention may have as object to overcome or ameliorate at least one of the disadvantages of the prior art, or to provide a useful alternative.

The invention is related to a microfluidic strategy substantially completely performed in a gaseous atmosphere ("in air") in contrast to a liquid surrounding, as most microfluidic strategies are related to. Hence, the strategy (and related production process) described herein may be described as in-gas microfluidics. Especially, the production process may be performed in air since air may be abundantly available. Hence the strategy and production process may also be referred to herein as in-air microfluidics (IAMF). Moreover, the acronym "IAMF" and the term "in-air microfluidics" used below do not exclude the use of any other gaseous atmospheres than air. Especially, the terms "in-gas", "in a gas atmosphere", "in a gaseous atmosphere", and "in-air" are used herein as completely interchangeable. If, for instance, the strategy is used to prepare material of which the (semi-) product or the starting material may be susceptible to oxidation, a nitrogen atmosphere may be used or the atmosphere may consist of a noble gas. Also these gaseous atmospheres are comprised by the term "in-air" microfluidics and "IAMF" herein.

Especially, in the in-gas or in-air microfluidics, the key benefits of AM may be combined with those of microfluidics. In particular, IAMF enables high throughputs, oil-free micro-particle production and direct contact-free deposition of liquids and solids onto arbitrary substrates, or receptor elements, while offering in-line control of material phase and shape as exploited in chip-based microfluidics. A relevant feature of IAMF is to merge physically or chemically interacting (reacting) liquids after ejection in flight, in the gaseous atmosphere prior to impact with any receptor element, similar to microfluidics and hence the name. However, the flow is governed by partly different mechanisms as compared to microfluidics, since air or another gas is used as a separating phase. After in-gas coalescence, the processed material may especially be collected in a bath to produce microfluidics base units, or be deposited onto a solid surface to "print" (partly) solid or liquid materials, such as to coat another material, for 2D patterning, e.g. for producing material libraries, and to generate (complex) 3-dimensional bodies.

Hence, in a first aspect, the invention provides a production process comprising a formation process, the formation process comprising: contacting a first liquid material and a second liquid material with each other at a contact point in a gas atmosphere, wherein at the contact point at least one of the first liquid material and the second liquid material is provided as a liquid jet propagating in a (respective jet) direction, to provide at the contact point a third jet of a coalesced third material ("third material") propagating in a third direction.

The first liquid material and the second liquid material essentially contact each other at the (mutual) contact point to provide the (coalesced) third material.

The process may comprise directing a first liquid jet comprising the first liquid material to a (virtual) collision point in the gas atmosphere, and directing a second liquid jet comprising the second liquid material to the (virtual) collision point, to provide at the collision point the (coalesced) third material. Especially, the contact point comprises the collision point. Such embodiments of the process (especially wherein at least two jets collide at a collision point) especially relate to an "in-flight" formation process.

The process may alternatively (and additionally, see below) comprise an "indirect contacting formation" process. Especially the indirect contacting formation process comprises: providing a second liquid jet comprising the second liquid material by a second liquid providing device comprising a second device face and a second device opening, wherein the second liquid jet is directed with a second liquid jet direction, and providing the first liquid material to the second device face at a position above said second device opening, and allowing the first liquid material and the second liquid material to contact with each other at the contact point (to provide the coalesced third material at the contact point), wherein the (liquid) contact point is configured at the second device opening or downstream thereof. Herein the term "above" as in the phrase "at a position above said second device opening" especially relates to a position being selected upstream of the liquid device opening (nozzle opening) such that a (spontaneous) flow of the first liquid (provided by gravity, inertia, or surface tension) over the device face (nozzle tip) may contact the first liquid material with the second liquid material at the second liquid device opening (to provide the coalesced third material).

Hence, the indirect formation process especially comprises: providing a second liquid jet comprising the second liquid material by a second liquid providing device comprising a second device face and a second device opening, wherein the second liquid jet is directed with a second liquid jet direction, and providing the first liquid material to the second device face at a position upstream of the second device opening, and allowing the first liquid material and the second liquid material to contact with each other at the contact point (to provide the coalesced third material at the contact point), wherein the (liquid) contact point is configured at the second device opening or downstream thereof.

Especially, allowing the first liquid material and the second liquid material to contact each other at the contact point may comprise allowing the first liquid material to temporarily accumulating at the second device face and successively (flowing downwards (especially because of gravity and)) contacting the second liquid material at the (first) contact point. Herein such embodiments of the process (especially wherein a first material is provided to a face and successively contacts another material at a contact point) especially relate to an "indirect contacting" formation process.

Herein the term "contact point" relates to a position where a (liquid) material contacts another (liquid) material. Especially, herein the term "(virtual) collision point" relates to a location where a liquid jet (potentially) contacts (or collides with) another liquid jet, especially in the gaseous atmosphere. The term "collision point" is especially used in relation with in-flight collisions (in the in-flight formation process). The term "contact point" may be used in relation to in-flight collisions, but also in relation to an indirect contacting via a face (see below).

Hence, in an aspect, the invention provides a production process ("process") comprising an in-flight formation process, the in-flight formation process comprising: providing in a gas atmosphere (i) a first liquid jet directed with a first jet direction to a (virtual) (first) collision point in said gas atmosphere, wherein the first liquid jet comprises a first liquid material, and (ii) a second liquid jet directed with a second jet direction to the (virtual) (first) collision point, wherein the second liquid jet comprises a second liquid material, to provide a (coalesced) third material at the (virtual) (first) collision point propagating in a third direction. Especially, the (first) contact point comprises the (virtual) (first) collision point.

Especially, in the production process, the first jet direction of the first liquid jet and the second jet direction of the second liquid jet have a mutual angle larger than 0° and equal to or smaller than 75°, especially equal to or smaller than 60°, such as equal to or larger than 5°, such as equal to or larger than 10°, and equal to or smaller than 45°. In embodiments the mutual angle is larger than 75°, such as selected in the range of 75–180°, especially in the range of 75°–90° or in the range of 90°-120°, such as substantially 90°. In yet further embodiments, the mutual angel is in the range of 120°-180°, such as substantially 180°.

The production process comprises providing at least one of the first liquid jet and second liquid jet as an uninterrupted liquid jet at said (first) collision point.

Especially, the process may comprise providing a liquid material through an opening (or "orifice") out of a liquid providing device, such as a nozzle, comprising the opening, especially to provide the (respective) liquid jet comprising said liquid material. Such liquid providing device may comprise a device face (especially a face substantially not contacting said liquid material). Especially, for providing a liquid jet, the liquid material is continuously, especially not intermittedly, provided through the opening.

Especially, in the production process described herein, the first liquid material and the second liquid material have different material properties, such as different viscosities, different densities, and/or different surface tensions, especially the first liquid material and the second liquid material have different surface tensions. In yet further embodiments, the first liquid material and the second liquid material have substantially the same surface tension.

Examples of a liquid material are a homogeneous liquid material and a heterogeneous liquid material, such as a suspension. A liquid material may comprise some gas or air, and may in embodiments comprise a foam. A liquid jet especially comprises a liquid material. In yet further embodiments of the invention, the first liquid material and the second liquid material have substantially the same material properties.

The first liquid material and the second liquid material especially coalesce at the (virtual) (first) collision point. Especially, the first liquid material and the second liquid material merge or pull together (i.e. coalesce) when providing (the third jet comprising) the third material (see further below). Especially, at a collision point, respective materials that collide at said point substantially do not (mutually) bounce, splash, atomize or e.g. provide a mist. In embodiments, at least 50 vol. %, such as at least 70 vol. %, such as at least 80 vol. %, such as at least 90 vol. % of the liquid materials arriving at a collision point (such as the first liquid material and the second liquid material) propagate(s) as a jet (such as a third jet) of the (e.g. third) coalesced material.

Especially, (also) the jets comprising the respective materials are configured not to atomize before impact (at the collision point). Especially, said jets are not configured in a wind-induced break up regime. Hence, especially a gas Weber number of a gas surrounding the liquid jet is smaller than or equal to 0.2, see further below.

In another aspect, the invention provides a device (or apparatus), especially for (use in) such production process comprising a formation process, the device comprising: a first liquid container configured to contain a first device liquid comprising a first device liquid material, in fluid connection with a first liquid providing device comprising a first device opening; a second liquid container configured to contain a second device liquid comprising a second device liquid material, in fluid connection with a second liquid providing device comprising a second device opening; a first liquid transporter configured to transport the first device liquid from the first liquid container to the first liquid providing device and through the first device opening; a second liquid transporter configured to transport the second device liquid from the second liquid container to the second liquid providing device and through the second device opening. Especially, at least one of the first liquid providing device and the second liquid providing device is configured to provide the respective device liquid material as a liquid jet propagating in a direction. Especially the first liquid providing device and the second liquid providing device are configured for providing the first device liquid and the second device liquid contacting each other at a contact point.

Especially, the second liquid providing device comprises a second device face. Such device may be used for an in-flight formation process. Alternatively or additionally, such device may be used for an indirect contacting formation process.

Hence, the invention provides a device (or apparatus) (especially for (use in) such production process comprising an in-flight formation process and/or an indirect contacting formation process), the device comprising: (i) a first liquid container configured to contain a first device liquid comprising a first device liquid material, in fluid connection with a first liquid providing device comprising a first device opening; (ii) a second liquid container configured to contain a second device liquid comprising a second device liquid material, in fluid connection with a second liquid providing device comprising a second device opening; (iii) a first liquid transporter configured to transport the first device liquid from the first liquid container to the first liquid providing device and through the first device opening to provide a first device liquid jet (comprising the first device liquid); (iv) a second liquid transporter configured to transport the second device liquid from the second liquid container to the second liquid providing device and through the second device opening to provide a second device liquid jet (comprising the second device liquid).

Especially, the first device opening and the second device opening are directed to a (virtual) (first) collision point in line of sight of both device openings, wherein the device openings and the (virtual) (first) collision point define an angle larger than 0° and equal to or smaller than 75°, especially equal to or smaller than 60°, such as equal to or larger than 5°, such as equal to or larger than 10°, and equal to or smaller than 45°. Especially, the contact point comprises the (virtual) (first) collision point and especially, the first device liquid and the second device liquid are provided to contact each other at the (virtual) collision point. In embodiments the device openings and the (virtual) collision point define an angle larger than 75°, such as selected in the range of 75-180°, especially in the range of 75°-90° or in the range of 90°-120°, such as substantially 90°. In yet further embodiments, said angle is in the range of 120°-180°, such as substantially 180°.

Especially, the first liquid providing device comprises the first liquid device. Likewise, especially any further liquid providing device, especially the second liquid providing device, may comprise any (respective) further liquid device, especially the second liquid device.

In embodiments, the first device opening is directed to the second device face. The term "face" especially relates to a face (of a liquid (providing) device) remote from the liquid material (in the liquid providing device and) provided by said liquid providing device. Especially the face substantially does not contact the liquid material (liquid jet) provided by said liquid device. Especially the face may receive the other liquid material and allow the other liquid material to flow towards the device opening, especially allowing to contact the liquid material (liquid jet) provided by said liquid providing device. A face may comprise one or more faces, especially faces contacting each other. A face may comprise a curved shape. Additionally or alternatively a face may comprise a straight shape or any other shape.

Especially, the second liquid providing device comprises a (second) nozzle, and especially the first device opening is directed to a face of the second nozzle ("second nozzle face"). In further embodiments, the first device opening is configured in physical contact with the second device face. Especially the first device opening is configured in physical contact with the second nozzle, especially the second nozzle face.

This production process ("process") and/or the device allow a relative easy and quick production and/or processing of all kinds of materials, including synthetic or natural polymers, plastics, metals, glasses, biological materials that contain or do not contain cells, foams, suspensions, emulsions, solutions, melts, solvents, etc., in all kinds of shapes. With the process, complex 3-dimensional structures as well as cylinders including fibers, spheres, spheroids, and disk-like shapes may be produced. Embodiments of the invention may be applied for additive manufacturing applications.

Especially, a device liquid jet comprises a liquid jet. Both terms refer to a liquid jet, but the first device liquid jet is not necessarily the first liquid jet, etc. Especially, the first device liquid jet, comprises the first liquid jet, and the second device liquid jet comprises the second liquid jet, etc. However, the first device liquid jet not necessarily comprises the first liquid jet, nor does the second device liquid jet necessarily comprises the second liquid jet, etc. It is noted that the first liquid providing device of the device according to the invention may comprise the first liquid material or the second liquid material, etc. The second liquid providing device may, e.g., comprise the first liquid material if the first liquid providing device comprises the second liquid material, etc. The terms first, second, third and the like in the description and in the claims, are used for distinguishing between similar elements and not necessarily for describing a sequential or chronological order. Analogously, also the first liquid device jet (of the device according to the invention) may comprise the first liquid jet. Alternatively, the first liquid device jet may comprise the second liquid jet (according to the process of the invention), and vice versa. Hence, also the first liquid material (of the production process) may comprise the second liquid container of the device, etc. The first (device) liquid jet and the second (device) liquid jet are especially configured to provide the first liquid material and the second liquid material at a mutual contact point. Especially, a first liquid material is provided by a first liquid jet provided by a first liquid providing device.

In embodiments, a contact point comprises a collision point. Especially a first (device) liquid jet and a second (device) liquid jet are directed to a collision point, especially to combine, especially to provide a (coalesced) third material at the collision point, and propagating in a third (jet) direction. In other embodiments, especially the first (device) liquid jet is directed to the second device face, especially to contact the second material provided by the second (device) liquid jet (provided at a device opening), especially to provide a (coalesced) third material, and propagating in a third (jet) direction.

Especially, a third jet (comprising the third (jet) direction) may comprise the third material. Especially, at the collision point a third jet is provided of the coalesced third material (propagating in the third direction). The "liquid device" especially refers to a device configured to provide a liquid. Likewise, the term "liquid providing device" especially refers to a device configured to provide a liquid. Especially, a "liquid device" comprises a "liquid providing device". Especially a liquid providing device comprises a face and a device opening. A liquid providing device may comprise a nozzle comprising a face and a nozzle opening, such as an orifice. Hence, a device face may comprise a nozzle face. Likewise, a device opening may comprise a nozzle opening (especially for providing a (device) liquid material). Especially, a device opening may comprise an orifice.

Herein the term "opening" such as in "nozzle opening" and "device opening" may also relate to more than one opening. Hence, a nozzle or a liquid (providing) device may comprise more than one opening. In embodiments, the (liquid) providing device comprises at least two (device) openings, especially arranged next to each other, such as in an aligned array, or in any other configuration. In a further embodiment, the (device) openings are arranged coaxially.

In an embodiment the nozzle comprises two coaxially arranged (device) openings. In embodiments, at least one of the liquid providing devices comprises a nozzle comprising two coaxially arranged (device) openings. Hence, at least one of the liquid providing devices (such as the first, the second or any optional further liquid providing device) may comprise two coaxially arranged device openings. In further embodiments all liquid providing devices comprise a single device opening.

Hence, a liquid jet (especially provided by a liquid providing device comprising two coaxially arranged device openings) may comprise two liquid materials. In an embodiment, at least one of the first liquid jet, the second liquid jet and the optional forth or further liquid jet comprises two respective (especially first and/or second and/or forth/further) liquid materials. A jet comprising two liquid materials may be directed to a collision point and collide with another jet to provide the coalesced material at a collision point.

In an embodiment (comprising a liquid providing device comprising coaxially arranged device openings), further, the second liquid material may be provided through the inner opening and the first liquid material may be provided through the outer opening, and especially the first liquid material and the second liquid material may contact with each other at a contact point (especially at the inner opening or downstream thereof), providing the coalesced third material. In a further embodiment comprising a nozzle with two axially arranged openings, especially a center opening and an outer opening surrounding the center opening, a liquid material is provided through the inner opening and a gas may be provided through the outer opening. In yet further embodiments, a coaxially arranged device opening may be used to provide one or more of the first or second liquid material and another fluid, which is different from first or second liquid material, and optionally at least part of the other fluid, may coalesce with the second or first liquid material. The other fluid may be a gas or liquid, especially a liquid. When the other fluid is a liquid, at least part thereof may also coalesce with the second or first liquid.

The second liquid jet may be provided by a second liquid providing device (comprising a second device face, etc.). Similarly, the first liquid jet may be provided by a first liquid providing device, etc. In embodiments, the device according to the invention may be configured to provide a second device liquid jet (comprising the second device liquid material) through the second device opening, wherein the second liquid providing device comprises a second device face and said second device opening, wherein the first device opening is directed to the second device face to provide the first device liquid to the second device face, especially wherein the first device opening is configured in physical contact with the second device face. Hence, in embodiments, the second liquid jet is provided by a second nozzle and the first liquid jet is directed towards a second nozzle and may impact the second nozzle face. Especially, in such embodiments, the first liquid material provided to the second device face (second nozzle face) may flow (especially as a result of gravitational forces) from the second device face (second nozzle face) towards the second liquid material (provided at the second device opening or nozzle opening). In such embodiments, the first liquid material may contact the second liquid material at the second device opening (second nozzle opening) or (just) downstream of the second device opening. In such embodiment, the contact point may be configured at the second device opening or downstream thereof.

Especially, the second liquid jet may comprises the contact point at a location (very) close to the second device opening (especially the second nozzle opening). Especially, in such embodiments, the first liquid material may contact the second liquid jet at substantially the same moment the second liquid jet is provided (formed) (at the second liquid opening). Yet in further embodiments, a contact point comprises a collision point.

Hence the elements "contacting a first liquid material and a second liquid material with each other at a contact point in a gas atmosphere" "to provide at the contact point a (coalesced) third material" as described herein may relate to directing a first liquid material (a first liquid jet) and a second liquid material (a second liquid jet) to a (virtual) collision point (to provide a collision) wherein a third material is provided at that collision point especially to provide the third material (propagating in a third direction) at said contact point. Alternatively, or additionally (if e.g. the formation process comprises more than one formation process, see below), the elements may relate to providing (a first liquid jet comprising) a first liquid material to (a face of) a (second) liquid providing device (such as a nozzle) providing a second liquid, and allowing the first liquid material to contact the second liquid material (the second liquid jet) at the contact point configured at the second device opening or downstream thereof, especially to provide the third material (propagating in a third direction) at said contact point. Especially the second jet direction may be configured to especially provide the third direction.

The liquid materials may contact each other at a contact point, especially at a collision point. It will be understood by a person skilled in the art that a "contact point", or a "collision point" may relate to a (small) volume wherein the liquid materials contact each other (rather than to a discrete single point). Such a volume may be affected by the flux (or flow, especially an average quantity in a determined time) of the liquid materials. In embodiments, said volume may e.g. comprise at least 1 picoliter, such as in the range of 1 picoliter-1 ml, especially at least 1 microliter. In further embodiments, said volume may comprise 1-100 ml.

In embodiments, the device comprises: (i) a first liquid container configured to contain a first device liquid comprising a first device liquid material, in fluid connection with a first liquid providing device comprising a first device opening; (ii) a second liquid container configured to contain a second device liquid comprising a second device liquid material, in fluid connection with a second liquid providing device comprising a second device opening and a second device face; (iii) a first liquid transporter configured to transport the first device liquid from the first liquid container to the first liquid providing device and through the first device opening; (iv) a second liquid transporter configured to transport the second device liquid from the second liquid container to the second liquid providing device and through the second device opening to provide a second device liquid jet, especially propagating in a second jet direction, especially wherein the first device opening is directed to the second device face (to provide the first device liquid to the second device face), and/or wherein the first device opening is configured in physical contact with the second device face to provide the first device liquid to the second device face.

In such embodiments the first (device) liquid is provided to the second device face. In embodiments, a material of the second device face may be selected to provide (a degree of) wetting of the second device face (with the first liquid material). The second (device) liquid jet may drag the first (device) liquid material along when provided through the second device opening. Especially, such embodiments may provide a less complex alternative to coaxial flow devices (e.g. used for spinning/spraying) known in the art. Such embodiment may provide a jet comprising a smaller diameter (perpendicular to the longitudinal axis of the jet), relative to a coaxial flow device. Known, coaxial flow devices on the market may not be able to provide a jet with a diameter smaller than 100 μm. However, in embodiments, the device according to the invention may provide a jet comprising a diameter smaller than 100 μm, such as equal to 10 μm.

In in-gas microfluidics (IAMF), at least two liquid materials, especially having different physical characteristics, especially are ejected and collide (in-flight) in a gaseous atmosphere. In other embodiments, said at least two liquid materials contact each other at a contact point especially at a device opening providing one of the liquid materials or downstream of said device opening. Especially, the liquid materials contact each other. Subsequently the materials combine, especially coalesce, to form a third material. By selecting the surface tension of the liquid materials differently coalesced material may be formed wherein a part of the liquid may encapsulate the remainder of the liquid.

Herein the terms "jet" and "stream" as in "liquid jet" and "liquid stream" are used interchangeably. Especially, a (liquid) jet comprises a (liquid) stream. The terms especially refer to a physical identity that is understood by the person skilled in the art and that may represent an intact non-broken, uninterrupted, and continuous stream of liquid (an "uninterrupted jet") as well as a broken, interrupted jet comprising a flow of liquid droplets, (all) traveling in the same (jet) direction, especially parallel to a longitudinal axis of the jet. In a jet, the content of the jet is continuously refreshed as liquid is provided at an upstream side of the jet and discarded (or collected) at a downstream side of the jet. A length of a jet may be defined as a distance between the upstream side of the jet and the downstream side of the jet. Hence, a jet may comprise an upstream side and a downstream side. Especially, a jet is generated at the upstream side, especially at the origin of the jet, e.g. at a device opening, such as an opening of a nozzle. Alternatively or additionally an origin of the jet may also comprise a contact point. Especially, the origin of the third jet comprises the (first) contact point. In a jet the (liquid) material especially flows from an upstream location to a downstream location. A jet, especially does not fan-out or disperse over the length of the jet. Locally, a cross section of a jet (perpendicular to the longitudinal axis of the jet) may vary in a modulated jet or e.g. a droplet train. However, especially a mean (or maximal local) cross section of the jet substantially does not change over the length of the jet. Especially, a ratio of the mean (or maximal local) cross section at the downstream side to the mean (or maximal local) cross section at the upstream side is in the range of 0.1-10, especially 0.25-4, such as 0.5-2, like about 1.

A jet may contact a surface, another liquid material, or any other disturbing material at any location between the origin of the jet and the (potential) downstream side of the jet. Especially, the potential downstream side refers to the downstream side of the same jet at the moment it does not contact any disturbing material, and thus may flow freely. In embodiments, the jet may contact another material at a position very close to the origin of the jet. In embodiments of the invention a jet may be provided and substantially at the same moment the jet may contact another material at a location of the jet (at a contact point being substantially coinciding with the origin of the jet). Such jet may comprise a length (a distance between the origin of the jet and said location being substantially zero (however, especially being non-equally to zero). Hence, herein the term (liquid) "jet" may refer to a jet (or stream) with a length being substantially zero. In other embodiments the term (liquid) "jet" may refer to a jet having a length that is substantially larger than zero. Especially, in embodiments wherein a (first) liquid material is provided at a (second) device face to contact a second liquid material provided through the device opening, the length of the (second) liquid jet may be substantially zero. Optionally in such embodiment also a length of a first liquid jet comprising the first liquid material may be substantially zero (e.g. wherein a first nozzle opening is applied to provide the first jet, and the first nozzle opening substantially contacts the second device face).

The term "a (liquid) jet" may refer to a single (liquid) jet. The term may also refer to a plurality of (liquid) jets. Especially, the term "a second liquid jet" may refer to a single second liquid jet. In embodiments, the term may also refer to a plurality of second liquid jets. Especially a plurality of jets (and the like) may comprise at least 2 jets, such as 2-1000 jets, especially 2-100 jets, even more especially 2-25 jets, such as 2-10 jets (and the like). Likewise, the terms "second liquid device opening" and the second liquid transporter" and the like, may also refer to a plurality of second liquid device openings and a plurality of second liquid transporters, etc. Each of the second liquid jets (of the plurality of liquid jets) may be directed to the (same) contact point, especially, the (same) virtual collision point. Especially, the second liquid jets of said plurality of liquid jets may (all) have substantially the same mutual angle with the first liquid jet. Hence, in embodiments a first liquid jet (material) and a plurality of second liquid jets (comprising the second liquid material) may provide the (coalesced) third material (at the virtual collision point) propagating in the third direction (see also below). Especially, in such embodiments, the plurality of second liquid jets may be configured to control the third direction. For instance, a second liquid jet comprising two second liquid jets may allow to direct the third material in a two dimensional direction. A second liquid jet comprising at least three second liquid jets may allow to direct the third material (even) in a three dimensional direction (see also below).

A (liquid) jet may be characterized comprising a stable, uninterrupted, or continuous liquid jet that remains continuous (intact) until the jet collides (with another jet, or e.g. a surface). A jet may also be characterized as an unstable and being broken up (especially in droplets), providing a liquid jet comprising only droplets, especially monodisperse droplets (see below). It is noted that a jet, especially an unstable jet, may be characterized by three parts: (a) a first part located most closely to the upstream side of the jet may show a straight intact liquid jet, wherein a width perpendicular to the longitudinal axis of the jet is substantially equal over said first part of the jet, (b) a last part, most remote from the upstream side, comprising only separated droplets, and (c) an intermediate part that connects the first part to the second part and comprising a distinguishable instability that may be observed from the width of the jet that changes, especially the width may repeatedly increase and decrease in the longitudinal direction of the jet. In the downstream direction especially the instability in the intermediate part may increase until the jet breaks-up. Hence, an instable or broken up jet, especially is provided as a continuous, uninterrupted jet at the origin of the jet and may further downstream of the origin break up and form an interrupted (or intermitted) jet. Especially, a location of the intermediate part, most remote from the origin of the jet, may be referred to herein as the breaking point, wherein a shortest length of a line connecting the origin of the jet and the breaking point is defined as $L_B$ herein. In embodiments of the production process at least one liquid jet is impacted by another liquid jet at a location in the intermediate part of the jet. In other embodiments at least one jet is impacted by another jet at a location in the first part of the jet. In yet other embodiments, at least one jet is impacted by another jet at a location in the third part of the jet (see also below). In yet other embodiments a jet first impacts with a surface and successively contacts another jet. Especially in such embodiment, the other jet may comprise an intact jet or a broken jet (e.g., comprising droplets).

The invention provides the production process comprising at least two liquid jets, such as two liquid jets, three liquid jets, four liquid jet, etc., especially providing a (coalesced) material that may especially be received, e.g. in a container, in a mold, at a substrate or in a receiving liquid. Especially said (coalesced) material is provided by contacting a liquid material with at least one further liquid material.

The invention is now first explained based on an embodiment of the production process comprising two liquid jets, see also e.g. the top-side of FIG. 1 (FIG. 1 depicts a process comprising three jets, however the top side is representative for a process comprising two liquid jets), wherein one liquid jet is an uninterrupted or continuous jet at the (first) collision point (also described herein as "at the moment of impact" or "at the location of impact"), and the other liquid jet comprises only droplets at the moment of impact. Especially in the former embodiment, the collision point comprises the contact point. The invention is also explained by another embodiment comprising a first jet provided at a face of a liquid (providing) device providing the second jet, see FIG. 8.

Herein this combination of an uninterrupted (also referred herein as "intact") jet impacting a jet of droplets is also referred to as a "drop-jet" mode. Herein, also the term "droplet train" and "drop train" is used for a liquid jet comprising only droplets. Hence, in the drop-jet mode, a droplet train impacts onto an intact liquid jet (or vice versa). In embodiments of the process the first liquid jet is directed from a first liquid providing device (nozzle) towards a (second) liquid providing device (nozzle) providing the second liquid jet, and the first liquid material contacts the second liquid material (substantially) at the (second) device opening (nozzle opening) or downstream from the second device opening. Herein such embodiment may also be referred to as (comprising) a "jet-nozzle" mode or a "nozzle-nozzle" mode. The process related to such mode, may also be referred to as "indirect contacting". Especially, wherein the "jet-nozzle" mode relates to an embodiment wherein a (first) jet is directed to a (second) device face (a second nozzle face) (e.g., as depicted in FIG. 8), especially wherein the (first) liquid jet impacts at the (second) device face. Especially a "nozzle-nozzle" mode relates to a configuration wherein a first liquid providing device (nozzle) providing said first liquid material is configured in physical contact with the second device face, especially a second nozzle face. Especially a jet-nozzle mode comprises a nozzle-nozzle mode. Especially a device opening of the (first) liquid device may physically contact the (second) device face (or nozzle).

To provide a jet to break-up more easily, in embodiments, said jet may be modulated. Additionally or alternatively, a jet may break-up when contacting a face, such as a face of a nozzle. Especially, in a jet-nozzle mode and/or a nozzle-nozzle mode a jet may break-up when contacting the nozzle (face). Especially, a jet-nozzle mode or a nozzle-nozzle mode may comprise a drop-drop mode, or a jet-drop mode or a jet-jet mode (see below).

A modulation may be provided on to the jet by a liquid device (such as (a combination of) (a) liquid providing device(s) (according to the invention) generating the jet(s). Especially, the device may comprise a (modulating) actuator suitable for providing the modulation (e.g. by providing vibrations to the liquid device). Specific (modulating) actuators may include, but are not limited to (1) an actuation device integrated with the nozzle as e.g. used in piezo-electric inkjet printers, (2) a piezo-electric element connected to the nozzle or to a liquid transporter, or (3) an actuation device as used in earphones or earplugs. In the latter two cases, the connection of the (modulating) actuator can be provided e.g. by pressing the nozzle or liquid connector onto the actuation device (or vice versa), or gluing by adhesive tape of solidifying glue. In embodiments, at least one liquid device comprises an (modulating) actuator to provide a modulated jet. In embodiments, a nozzle is actuated, and especially the (modulating) actuator comprises a piezo-electric element. In other embodiments the (modulating) actuator comprises a vibrating element that directly induces a fluctuating pressure onto the liquid material. Modulating a liquid jet may especially provide breaking up of the jet in small droplets, especially having a diameter selected in the range 1-10, especially 1-5, such as 1-3, even more especially 1-2 times as large as a diameter of the liquid device opening providing the respective liquid jet. Such broken up jet may comprise a continuous flow of small droplets, especially wherein a distance between subsequent droplets is substantially constant.

In further embodiments, the (modulating) actuator comprises an element configured to vibrate. Especially, one or more of the first liquid (providing) device and the second liquid (providing) device comprises a (modulating) actuator comprising an element configured to vibrate ("vibrating element"). Herein, a (modulating) actuator may also relate to more than one (different) (modulating) actuators. In embodiments, each liquid providing device comprises a (modulating) actuator. In further embodiments one or more liquid providing devices (together) comprise one (or more) (modulating) actuator(s). In yet further embodiments, the liquid providing devices are configured at a base, especially wherein the base comprises a (modulating) actuator. Especially a vibrating element is arranged to provide a vibration to a liquid (providing) devices, especially to a nozzle of the liquid (providing) devices, and especially to a liquid jet provided by that nozzle.

An element to vibrate (vibrating element) may be configured to vibrate at a frequency (of vibration). Especially, in embodiments of the process (see also below), a vibration may (also) be selected to comprise said frequency. Such frequency may, e.g., be selected in the range of a single hertz. Alternatively or additionally, the frequency may be selected in the kilohertz range. Yet, the frequency may further be selected in the megahertz range. Especially, the element (configured to vibrate) may be configured to vibrate at a frequency selected in the range of 0.1 Hz-100 MHz, especially 1 Hz-100 MHz, such as in the range of 1 Hz-1 MHz, especially in the range of 100 Hz-1 MHz, even more especially in the range of 100 Hz-100 kHz. In further embodiments, the frequency is selected in the range of 1 kHz-1 MHz, such as 1 kHz-100 kHz. Hence, a liquid providing device according to the invention may comprise an actuator, especially to provide a vibration (having a frequency) to a liquid nozzle. In embodiments of the process the frequency may (also) be selected in the above given ranges. Hence, the process according to the invention may comprise vibrating one or more of the liquid devices.

Especially, a nozzle may be actuated to affect the breakup of a liquid jet into a droplet train. Especially, monodisperse droplets may be generated by controlled breakup of a liquid jet ejected from a nozzle. Especially, a monodisperse droplet train may be directed to an intact liquid jet ejected from another nozzle. When the droplet train impacts onto the intact liquid jet this may provide a coalesced third material propagating in a third direction. A jet may also be directed to a face of a liquid device providing a droplet train, providing a coalesced third material propagating in a third direction. In embodiments, it may result in a compound monodisperse droplet train flowing downwards. Especially, the term "monodisperse" droplets relates to a monodispersed size distribution of droplets, wherein the standard deviation is less than 30% (of the average size), especially less than 8% (of the average size)

Hence, in embodiments, the production process (further) comprises modulating one of the first liquid jet and the second liquid jet for providing one of the first liquid jet and the second liquid jet as interrupted liquid jet at said collision point. In further embodiments, the production process (further) comprises modulating one of the first liquid jet and the second liquid jet (especially the second liquid jet) for providing one of the first liquid jet and the second liquid jet (especially the second liquid jet) as interrupted liquid jet at said contact point. Especially, the device described herein comprises one or more (modulating) actuators configured to provide one or more of a modulated first device liquid jet and second device liquid jet. In embodiments, the device may comprise one (modulating) actuator configured to modulate the first device liquid jet and the second device liquid jet. However, in specific embodiments the production process comprises providing at least one of the first liquid jet and second liquid jet as uninterrupted liquid jet at said collision point and/or contact point. Hence, for this jet there may be no modulation or a modulation that does not lead to a break-up of the jet at a location upstream of the collision point. Especially, the (modulating) actuator may be configured to provide a vibration to a nozzle. For providing a continuous (modulated) jet, the vibration may be continuous, especially comprising a steady (especially continuous and substantially non-changing) frequency. Hence, in further embodiments, the production process (further) comprises providing a vibration to a liquid jet, especially for providing the liquid jet as a modulated liquid jet (see also below). In embodiments, a vibration is provided to the first liquid jet (providing a modulating first liquid jet). In further embodiments, a vibration is provided to the second liquid jet (providing a modulating second liquid jet). Yet, in further embodiments, a vibration is provided to a further liquid (providing) jet (and providing a modulating further liquid jet). In further embodiments, the production process comprises providing a vibration to one of the first liquid jet and the second liquid jet (especially the second liquid jet) for providing one of the first liquid jet and the second liquid jet (especially the second liquid jet) (especially the respective liquid jet, especially provided with the vibration) as interrupted liquid jet at said contact point. Herein, providing a vibration (or modulation) to a liquid jet, may especially relate to providing a vibration to a liquid providing device (providing the liquid jet), especially to a nozzle thereof.

Especially, the two liquid materials coalesce, and one liquid phase (optionally) encapsulates (and immobilizes)

another liquid phase (i.e., the remainder of the liquid), and especially at least part of the provided third material may solidify.

It was experimentally found that coalescence, encapsulation, and solidification dynamics that occur (in-flight), in the gaseous atmosphere seem to play an important role in IAMF (see also FIG. 2). First, the droplet impacts onto the jet. Especially, impact may result in coalescence, i.e. bouncing preferably is prevented. Furthermore, production of spherical particles especially may require that the droplet substantially maintains its spherical shape during impact. Experimentally (see experimental section) it was found that both conditions may be met if the impact Weber number $We_{impact} = \rho V^2_{impact} D_1/\sigma_1 < 50$, preferably <10, with $\rho$ the density, $D_1$ the droplet diameter, and $\sigma_1$ the surface tension of (the liquid in) the droplet, wherein the impact velocity $V_{impact} = V_{ej} \sin \Theta$ depends on the impact angle $\Theta$ and the ejection velocity (the velocity at the opening of the liquid device) $V_{ej}$ of the jet providing the droplet train. Especially, for a jet-nozzle and/or a nozzle-nozzle mode said condition may be met under most practical conditions, especially since $V_{impact}$ may be substantially. For instance, in embodiments the impact velocity may be selected from the range of 0.2-500 m/s, such as 0.2-50 m/s, like 0.2-30 m/s. Yet, in other embodiments, the impact velocity is may be in the range of 0.05-0.2 m/s.

After impact, coalescence of part of a liquid jet, especially part of the intact fluid jet, and part of another liquid jet, especially a droplet of a droplet train, may be provided.

For providing a liquid jet, especially the liquid Weber number $We_l$ is selected to be equal to or larger than 1. The liquid Weber number, $We_l$ being defined as $\rho_l V^2 D/\sigma_l$, with $\rho_l, V, \sigma_l$ being the density, velocity and surface tension of the liquid respectively. D relates to a characteristic dimension of the jet, especially the diameter of the jet. Yet, in embodiments, the Weber number as well as the diameter D may be related to a diameter of a droplet in the liquid jet. The liquid jet may be provided in the Rayleigh breakup regime, especially to provide droplet formation by Rayleigh breakup.

The upper liquid Weber number (velocity limit) may be bounded by wind-induced breakup, which occurs for gas Weber numbers $We_g = \rho_g/\rho_l \cdot We_l > 0.2$, with $\rho_g$ the density of the gas. The Rayleigh breakup regime especially relates to a jet provided in a gas, comprising a (liquid) weber number equal to or larger than 1, wherein the gas weber number is equal to or smaller than 0.2. When the liquid velocity (in the liquid jet) further increases, a velocity of the jet relative to a velocity of the surrounding gas may no longer be neglected. Aerodynamic effects may accelerate a breakup process and a shortening of the length between the nozzle exit and a location of droplet pinch-off may be observed. Especially a transition from the Rayleigh breakup regime to a first wind-induced breakup regime may occur when the inertia force of the surrounding atmosphere (gas) reaches a significant fraction of the surface tension force, especially at $We_g > 0.2$. Hence, especially, the gas Weber number is selected to be equal to or less than 0.2 to prevent a wind-induced break-up of the liquid jet. Hence, for providing a continuous liquid jet or an interrupted liquid jet, especially, the liquid Weber number is selected to be smaller than or equal to $0.2 \cdot \rho_l/\rho_g$. Especially, the liquid Weber number is selected to be larger than or equal to 1, especially larger than or equal to 3, such as larger than or equal to 4, for providing a continuous liquid jet The production process of the invention essentially comprises coalescing a liquid material (of a liquid jet) with a further liquid material (of further liquid jet). Especially, said liquid materials substantially completely coalesce. Especially, the production process does not comprise wind-induced breakup. The production process of the invention especially (also) does not comprise atomization of a liquid jet. Wind-induced breakup but especially atomization may disable a substantially complete coalesce.

Especially, in an indirect contacting formation process (especially in a jet-nozzle mode), contact of a first liquid material with a second liquid material, especially a droplet of a droplet train (comprising the second liquid material (jet), may result in coalescence of the second liquid material and the first liquid material. The type of coalescence may depend on the material properties of the combined liquid materials as is understood by the person skilled in the art. Coalescence, may, e.g., occur as a segmenting (segmented) coalescence (especially wherein a droplet of a droplet train-collides and sticks to a jet and successively almost directly the jet breaks up into segments) or a clinging coalescence (especially, a collision in which a drop or a jet hits and clings to the (other) jet and vice versa providing an intact jet (that eventually may break up). Encapsulation of liquid by another liquid may be affected by the difference in the surface tension (of the liquid material) of the two liquids, especially of the liquid materials of the liquid jets (the first liquid material and the second liquid material). Especially, when the surface tension of a first liquid (especially comprised in the liquid material of the intact liquid jet) is lower than the surface tension of another liquid (especially comprised in the liquid material of a droplet train), the liquid of the first liquid may encapsulate the other liquid. Especially, when the surface tension of a first liquid material accumulated at a nozzle face and flowing down from said nozzle is lower than the surface tension of another liquid material of a jet provided by said nozzle, the first liquid material may encapsulate the other liquid (at the contact point). As a result, a thin film of the low surface-tension liquid may be "pulled" around a higher surface-tension liquid and may immobilize the higher surface tension liquid. Pulling of this thin film of the lower surface tension liquid around the higher surface tension liquid may be the result of a Marangoni flow (driven by a surface tension gradient). This mechanism may allow for (rapid) (in-air) encapsulation of both miscible and immiscible liquids, while limiting droplet deformation. Alternatively or additionally, the mechanism may allow encapsulation initiated by surface tension differences induced by surfactants in pure liquids and/or mixtures. Especially, the surface tension of the two liquid materials colliding (at the collision point) may be selected to be different.

Especially, the surface tension of the two liquid materials contacting (at the contact point) may be selected to be different. A (largest) ratio of the surface tensions of the different liquid materials is at least 1.005, such as at least 1.01, especially at least 1.05. Especially this ratio is at maximum 10, especially at maximum 7. Hence in embodiments a ratio of the different surface tensions is at least 1.05 and not more than 7. Alternatively to selecting the surface tension of the liquid material in the (uninterrupted) jet lower than the surface tension in the liquid material of the droplet train, the surface tension of the liquid material in the intact jet may be selected to be higher than the surface tension of the liquid material in the droplet train. Especially, in such an embodiment, the liquid comprised in the droplet train may encapsulate the liquid comprised by the (uninterrupted) jet.

Encapsulation of a liquid by another liquid may also be affected by the viscosity of a liquid and the contact between the different liquid materials. During experiments, it was noticed that it may be advantageous using a jet-nozzle (including a nozzle-nozzle) mode (an indirect contacting formation process) for encapsulation of a liquid material. Especially when contacting the other liquid material, the liquid material accumulated at the nozzle (and successively flowing to the opening of the nozzle) may substantially completely encircle the other liquid material at the contact point in such embodiments. The nozzle may break-up the liquid jet when the liquid impacts the nozzle. Especially, the liquid material may accumulate around (/about) the nozzle, and especially after flowing to the nozzle opening the liquid material may encircle the other liquid material. Hence, in such embodiments, especially the process conditions and hardware condition may affect the encapsulation process. Especially, in such embodiment, especially a high viscous liquid material may more advantageously encapsulate another liquid material. In such embodiments for instance also the properties of the liquid device face may affect the process. In embodiments, e.g. the nozzle face (liquid providing device face) comprises hydrophilic properties (e.g. a hydrophilic coating). In other embodiments, the nozzle face (device face) comprises hydrophobic properties (e.g. a hydrophobic coating). Especially, in such former embodiments an aqueous first liquid material may advantageously encapsulate a second liquid material (provided through the device opening of the device) because it may accumulate all over the nozzle (device face). Especially, in the latter embodiments, a hydrophobic liquid material will advantageously spread around (about) the nozzle (device face), whereas an aqueous liquid material may accumulate only at one side of the nozzle (device face). The indirect contacting formation process may advantageously be applied for high viscosity liquid materials, such as for a viscosity equal to or larger than 100 mPa·s, such as equal to or larger than 1 Pas. The indirect contacting formation process may especially be applied if a Marangoni flow may be hindered or hardly is present. Alternatively, an in-flight formation process comprising a plurality of second jets may be applied if a Marangoni flow may be hindered or be hardly present (see also below). Especially, a Marangoni flow may be substantially absent for liquid materials comprising a high viscosity.

In embodiments, the surface tension of the two liquid materials may also be selected to be substantially equal to provide the (coalesced) third material. Especially, this last (coalesced) third material may comprise a homogeneous mixture of the first and second material. The third material may comprise homogeneously distributed first and second material, especially comprising an irregular shape, and especially not being monodisperse. In other embodiments, the first and second materials do not mix. Especially in such embodiment, the third material may comprise a heterogeneously distributed first and second material, especially comprising two segregated regions, for instance providing a "janus" particle (see further below). Hence a coalesced material may also comprise a heterogeneous material or a material comprising segregated regions.

Finally, at least part of the coalesced third material, such as a formed compound droplet, may solidify. Solidification of droplets may enable the production of particles. Especially, the inner and outer liquids can be selected such that one or both of the inner and outer liquid solidifies, for example by gelation, precipitation, or freezing, etc. In embodiments, especially one or more of the first liquid material and the second liquid material are solidifiable. In other embodiments the first liquid material and the second liquid material are not solidifiable.

Depending on the required time scales for these steps, typically the (in-flight) formation process may take less than a few seconds, such as less than a second, especially 10-500 ms. Subsequently, the coalesced third material may be collected, e.g., in a collector, in a bath, or (deposited) onto a solid surface, or received in any other type of receptor element. The term "bath" especially relates to depositing and/or receiving and/or collecting the coalesced (third) material and/or product of the process (see below) in a liquid (in the bath). A bath especially comprises a liquid. Hence, especially a distance between the contact point and the receptor element may be configured to provide the required time scale (see below).

Additionally or alternatively, using two stable, uninterrupted liquid jets, the production process may comprise a "jet-jet mode", wherein both jets are intact when they impact on each other. Hence, in other embodiments, the production process comprises providing both the first liquid jet and second liquid jet as uninterrupted liquid jets at said collision point. In embodiments (comprising a jet-nozzle mode or nozzle-nozzle mode) the jet directed to a face of a liquid providing device is not an intact jet any more when (the liquid material provided by said jet) contacting (contacts) the other jet (provided by said liquid providing device). However, especially the liquid material provided by the former jet may still provide a continuous flow of said material towards the contact point. Especially, also such mode (wherein a first intact jet is provided to a face of a liquid providing device and a second intact jet is provided by said device opening) relates to a jet-jet mode. In further embodiments, the production process comprises providing both the first liquid jet and second liquid jet as uninterrupted liquid jets. Alternatively, the first liquid may flow from the liquid device (face) in a continuous flow and especially envelop (see also above) the second uninterrupted jet. In further embodiments, the first liquid device opening is configured (coaxially) around the second device opening, especially in a nozzle comprising two coaxially arranged openings (see also above). Such embodiments enable to spin fibers, by solidifying one of the liquids prior to breakup of the merged jet. Especially such mode may provide fibrous (core-shell) material. Hence in embodiments, one of the liquid providing devices is configured to provide an uninterrupted (intact) (device) liquid jet at a location up-stream of the collision point up to the collision point for providing the third material, especially wherein the third material comprises fibrous material. In further embodiments, a nozzle-nozzle and/or a jet-nozzle mode may provide the third material comprising fibrous material.

Using two jets, the production process may in an aspect also comprise a "drop-drop mode", wherein both jets comprise a droplet train, and the (droplets of the) two droplet trains impact on each other. Such drop-drop mode may e.g. advantageously be applied to sort out droplets before impact. For instance deviating (e.g. in size or composition) droplets may be redirected (such as by air or electromagnetically) upstream of the collision point, and especially to prevent them from ending up in the (coalesced) third material.

Especially in the drop-jet mode, a shortest length of a line connecting the origin of the liquid jet (the upstream side of the liquid jet) comprising the drop train (the modulated liquid jet) and collision point is larger than LB. In embodiments comprising the jet-jet mode, both liquid jets may not be modulated. In other embodiments, comprising the jet-jet mode, one of the liquid jets may be modulated, wherein the other liquid jet may collide in said first part of the liquid jet.

Alternatively, the collision point may also be configured further downstream, wherein the modulation in one of the liquid jets has induced a (regularly) changing width of the liquid jet in the longitudinal direction. Especially, the collision point may be configured in the intermediate part of the liquid jet.

Hence in further embodiments, the production process comprises modulating one of the first liquid jet and the second liquid jet for providing one of the first liquid jet and the second liquid jet as uninterrupted liquid jet having a variable width (over a certain length of the jet) in a direction perpendicular to the respective jet direction at said collision point. In further embodiments, the production process comprises providing a vibration to one of the first liquid jet and the second liquid jet, to provide one of the first liquid jet and the second liquid jet (i.e. the respective liquid jet being provided with the vibration) as uninterrupted liquid jet having a variable width (over a certain length of the jet) in a direction perpendicular to the respective jet direction at said collision point. Especially, a vibration is provided by means of a (modulating) actuator comprising a vibrating element configured to vibrate at a frequency described herein, especially selected from the range of 1 Hz-1 MHz, especially 100 Hz-1 MHz. An actuator (comprising the vibrating element) may be comprised by one or more of a first liquid providing device providing the first liquid jet and a second liquid providing device providing the second liquid jet.

Embodiments of the device, especially of a liquid providing device, may comprise the (modulating) actuator, especially the (modulating) actuator comprising the element configured to vibrate to provide one of more of said (modulated) first (device) liquid jet and second (device) liquid jet with the respective (device) jet having a variable width in a direction perpendicular to a respective (device) jet direction. Especially, in such embodiments the device is configured to provide one of more of said modulated first (device) liquid jet and second (device) liquid jet with the respective jet breaking into (liquid) subunits after a breaking length (LB) determined from the respective device opening, wherein the breaking length (LB) is equal to or shorter than a distance from the respective device opening to the virtual collision point. Hence, a modulated jet may have a variable width in a direction perpendicular to its jet direction. Especially, said width is larger than 0 at a (especially all) location(s) between the origin of the jet and the breaking length. Especially said with is non-zero at the origin of the jet. Essentially, said width may include 0 at a location downstream from the breaking length. In further embodiments, the distance between the collision point and the device opening may be arranged to be smaller than the (optional) breaking length of the jet provided by the respective device opening. In such embodiment, the instability (modulation) of the respective liquid jet may (after collision with a second liquid jet and together providing a third liquid jet of coalesced material) be transposed to the third liquid material. Successively, the third liquid jet may break into subunits (droplets).

Alternatively, the production process and the device may comprise at least one further (such as a fourth) liquid (device) jet and optionally liquid providing device, next to two (device) liquid jets and optionally two liquid providing devices. A further liquid jet (or liquid device jet provided by a liquid providing device), for instance is comprised in embodiments, wherein the further (device) liquid jet is directed to a further contact point or further collision point, and wherein the further collision point is located at one of the first (device) liquid jet and the second (device) liquid jet (and hence upstream of the (first) collision point). In further embodiments a further liquid jet (or liquid device jet provided by a liquid providing device) is directed to a further contact point, especially wherein the further collision point is located at one of the liquid device face and the second liquid device face (and hence upstream of the (first) collision point). In yet further embodiments, the further (device) liquid jet is directed to another further (a second) contact point, such as a (second) collision point located downstream of the (first) contact (collision) point to impact the (coalesced) third material, especially the third jet, especially providing a further coalesced material, and especially propagating in a further direction. Embodiments comprising more than two liquid jets may advantageously be combined. Especially, embodiments comprising more than one contact point may advantageously be combined. These embodiments may comprise a number of in-flight formation processes in series, especially wherein a product of one in-flight formation process (e.g. a coalesced material, such as a coalesced third material) may provide one of the (two) (device) liquid jets of another in-flight formation process. In embodiments, the (coalesced) third material in a third direction of a first in-flight process provides the first (or second) liquid jet in a first (or second) direction of a second in-flight process. In further embodiments, one or more of the first liquid jet and the second liquid jet are the product (i.e. the third material or the third jet) of an in-flight formation process. In further embodiments, one or more of the first liquid material and the second liquid material are the product of a formation process described herein, especially of an in-flight or indirect contacting formation process. Especially, the first and the second liquid material may be selected independently to be the product of an in-flight formation process and an indirect contacting process (or not being the product of a formation process described herein). Hence, the production process may comprise a plurality of in-flight formation processes. The production process may also comprise a plurality of indirect contacting formation processes. In embodiments, the production process comprises at least one in-flight formation process and at least one indirect contacting formation process.

Many different embodiments may be provided wherein an uninterrupted (device) liquid jet impacts on an uninterrupted (device) liquid jet or e.g. a droplet train. Also many different embodiments may be provided wherein an interrupted or an intact (device) liquid jet is directed to a device face and another liquid jet is provided by said device.

In embodiments, a (device) liquid jet comprises a droplet train and said droplet train is directed to a product of a first in-flight formation process, comprising also a droplet train. In other embodiments, the product of a first in-flight formation process comprises a droplet train and the (device) liquid jet that is directed to said droplet train comprises an uninterrupted (device) liquid jet, etc.

In embodiments, a further liquid jet is provided to add an additional encapsulating layer at the coalesced third material. In such embodiments the further liquid jet impacts at a location downstream of the (first) contact point at a further contact point or collision point. Especially, in such embodiments the further liquid jet impacts at a location downstream of the (first) collision point. In such embodiment, the further liquid jet may comprise a further liquid jet material being identical to either the first liquid material or the second liquid material or different to both liquid materials. Especially, the fourth liquid material comprises an equal or lower surface tension as compared to the second liquid jet material (provided in the encapsulating phase of the coalesced third material).

Hence, the invention also provides the production process, (comprising a "combined formation process") further comprising: providing in said gas atmosphere a fourth liquid jet directed with a fourth jet direction to a second contact point, especially a second collision point, in said gas atmosphere, wherein the fourth liquid jet comprises the fourth liquid material; and coalescing the coalesced third material (of the third liquid jet) and the fourth liquid material, to provide the coalesced fifth material ("fifth material") at the second contact point, especially at the second collision point propagating in the fifth direction, especially wherein the third direction and the fourth jet direction of the fourth liquid jet have a mutual angle larger than 0° and equal to or smaller than 45. In embodiments, a further coalesced material and the fifth coalesced material are the same.

Especially, the second contact point comprises the second collision point. In further embodiments, the first contact point comprises the first collision point. Hence, in embodiments, the invention also provides the production process wherein the in-flight formation process comprises a combined in-flight formation process, the combined in-flight formation process comprising: providing in said gas atmosphere (i) said first liquid jet directed with said first jet direction to said collision point in said gas atmosphere, wherein said first liquid jet comprises said first liquid material, and (ii) said second liquid jet directed with said second jet direction to said collision point, wherein said second liquid jet comprises said second liquid material, to provide (a third liquid jet comprising) said (coalesced) third material at said collision point propagating in said third direction (especially third jet direction); and providing in said gas atmosphere a fourth liquid jet directed with a fourth jet direction to a second collision point in said gas atmosphere, wherein the fourth liquid jet comprises a fourth liquid material; and coalescing the coalesced third material and the fourth liquid material, to provide a (coalesced) fifth material at the second collision point propagating in a fifth direction.

Especially, in specific embodiments the third direction (of the third jet) and the fourth jet direction of the fourth liquid jet have a mutual angle larger than 0° and equal to or smaller than 75°, especially equal to or smaller than 60°, such as equal to or larger than 5°, such as equal to or larger than 10°, and equal to or smaller than 45°. Especially, at least one of the first liquid jet and forth liquid jet are provided as uninterrupted liquid jet at said collision points. Further, especially the coalesced third material and the fourth liquid material have different surface tensions.

Especially, contacting the coalesced third material and the fourth liquid material comprises coalescing the coalesced third material and the fourth liquid material. The second contact point, especially the second collision point, may be located downstream (in the third jet) of the first contact point (or first collision point). Yet in embodiments, the first contact point, especially the first collision point, and the second contact point, especially the second collision point, substantially coincide (see also below). Especially the first contact point may substantially coincide with the second collision point, especially the first collision point substantially coincides with the second collision point.

In embodiments, such combined formation production process comprises a jet-nozzle mode (or a nozzle-nozzle mode), wherein the second liquid material is provided to (a face of) a liquid providing device providing the first liquid jet to provide the third material at a (first) contact point. In other embodiments, a first liquid jet and a second liquid jet are (both) directed to a (first) collision point, to provide the third material at the first collision point. Especially, in embodiments comprising a series of formation processes, the first formation process may comprise an indirect contacting formation process. Especially, in successive further formation processes two jets collide at a collision point (comprising a contact point). Especially a further formation process comprises an in-flight formation process.

Especially, the invention also provides the device as described herein further comprising a fourth liquid container configured to contain a fourth device liquid comprising a fourth device liquid material, in fluid connection with a fourth device liquid providing device comprising a fourth opening, a fourth liquid transporter configured to transport the fourth device liquid from the fourth liquid container to the fourth liquid device and through the fourth opening to provide a fourth device liquid jet, wherein the fourth device opening is directed to a second virtual collision point downstream of said (first) virtual collision point and/or downstream of said (first) contact point. Especially the fourth device liquid jet comprises the fourth liquid jet.

It is surprisingly found that the production process and the device of the invention enable rapid production of a variety of shapes. IAMF enables rapid production of, particles, liquid droplets, partly solid particles, and fibers in various shapes, sizes and comprising various (internal) structures (phases), see e.g. FIGS. 2 and 3. Moreover, using the device and process described herein, complex 3-dimensional structures comprising the particles may be generated (see below). Especially, in the production process substantially all of the first material and second material are combined (coalesce) to provide the third material. Especially, substantially no (first, second, third, etc.) liquid material is lost in the process. Amongst others, this may be achieved by selecting the dimension of the jets, the materials of the jets, the velocities of the jets, the mutual angle of the jets, etc., especially as described herein.

In embodiments, the production process provides droplets, including droplets that consist of multiple phases or droplets surrounded by a solid shell. In further embodiments, the production process provides substantially round shaped (at least partly) solidified particles. Yet in a further embodiment, the production process provides fibers.

Especially by selecting the mutual velocity(s) (the velocity of the first (device) liquid jet with respect to the second (device) liquid jet and (optionally) the third direction (the third jet) and the fourth (device) liquid jet, i.e. the velocities of the different liquid jets at the location of collision points), the shape of the one or more particles may be controlled. Additionally or alternatively, the shape may be controlled by selecting the angle between these jets. The mutual angle(s) is (are) especially selected to be larger than 0° and equal to or smaller than 90°, especially at maximum 60°, such as at maximum 45°. In embodiments the mutual angle is selected between 0° and 35°, especially in the range 10°-30°. In other embodiments, the mutual angle(s) is (are) selected in the range of 60-180°, especially in the range of 90-180°, such as in the range of 90-120° or in the range of 150-180°. Especially by selecting a large angle (of at least 90°) of the liquid jets colliding, mixing of the materials comprised in the respective liquid jets may be facilitated. Especially, (providing) a large impact angle (such as 90-180°) may be advantageous for e.g. in-air mixing of two or more liquid materials (comprised by respective liquid jets). Especially mixing may be facilitated because of a high surface/volume ratio of the small droplets. Additionally or alternatively, the shape of one or more particles may be controlled in a jet-nozzle or a nozzle-nozzle mode by selecting a flux or flow (especially a quantity over a time) of the jet directed to the nozzle face in relation to the flux or flow and/or the velocity of the jet provided by said nozzle. Especially in a jet-nozzle mode a first liquid material may be entrained by a second liquid jet (at the contact point). Especially, the second liquid jet velocity must be at least equal to the velocity of the first liquid at the contact point.

In embodiments of the device one or more of a position of the first device opening and a position of the second device opening is controllable, wherein the device further comprises an actuator configured to control one or more of the position of the first device opening and the position of the second device opening. For instance, by rotating (part of) the first device and/or the second device, the first and/or second device openings can be positioned in different positions allowing e.g. different mutual jet angles. In further embodiments positioning may be done by translation. Especially an actuator is configured to translate. Especially such embodiments may allow controlling the mutual angle. Such embodiment may also allow controlling positioning of one of the device openings relative to the device face of the other device. Especially such actuator may control a direction of a liquid device jet. Especially such embodiments may (also) allow controlling a distance between liquid devices. Such embodiment may further allow configuring a location of the collision point(s), especially relative to a location of a receptor element. Especially, such actuators may control a location of a liquid device jet. Herein, an actuator also may comprise more than one actuator. In some embodiments, one actuator may be configured to control the position of the first device opening. In embodiments, an actuator may be configured to control a position of a liquid (providing) device. Additionally another actuator may be arranged to control the position of the second opening. In other embodiments the device comprises one actuator that may control the position of the first opening and (the position of) the second opening. In further embodiments least one of the devices may rotate about an axis parallel to a respective longitudinal jet axis, allowing to rotating the jet provided by the device about the longitudinal axis. Especially for such embodiments, actuators may be configured to provide the rotation. Especially, embodiments of process may comprise controlling at least one actuator. For instance, the process may be used to provide a (third) material comprising a coil shape (e.g. by rotating a device about an axis). This (these) actuator(s) may differ from the (modulating) actuator(s) that provide the modulation of one or more of the (device) liquid jets. In embodiments, these actuators may be the same actuator(s). Especially, the production process described herein may comprise twining. Herein the term "twining" relates to twisting or intertwining and especially to providing a rotated or twisted configuration. Twining may e.g. be provided by rotating the device providing a jet. Twining may also be provided by rotating the coalesced third (or further) material downstream form the contact point (while not changing the jets of the first and second liquid material, e.g. by rotating a receptor element receiving the coalesced third (or further) material. In other embodiments twining may e.g. be provided by the impact of one of the liquid materials on the other at the location of impact (see also below). Hence, in embodiments the method may include twining at least one of the materials around at least another one of the materials.

Rapid or automated control of the position of the device opening may further enable to selectively impact and coalesce material, such that in one state the first (device) liquid jet collides with the second (device) liquid jet as described above, whereas in another state the first (device) liquid jet does not collide onto the second (device) liquid jet. Such embodiments allow for selecting/sorting selected parts of a liquid jet. For example, only droplets (in a droplet train) comprising a (biological) cell can selectively be impacted, or only parts of a liquid fiber can be impacted to form fibers of controlled length.

Alternatively or additionally to controlling the device opening, a (device) jet may be deflected (post-ejection) in order to provide a selective impact (of two (device) liquid jets) and coalescence. Such selective post-ejection deflection may be achieved using an electric field, blowing air, etc. In other embodiment the liquid material comprises magnetic material and deflection may be provided by a magnetic field. Especially, embodiments (of the device) may comprise a further actuator configured to control the deflection, and especially one of the (first, second, or any further) device openings may not be directed to the respective (virtual) collision point. Especially the actuator controls the locations of collision, especially to provide a collision of at least two liquid jets a gaseous atmosphere. Hence also other types of actuators that may control a direction of a liquid jet may be comprised is embodiments as will be understood by the person skilled in the art.

As discussed above, coalesced material (i.e. products of the in-flight formation process) comprising a substantially round shape may be provided in embodiments (comprising liquid jets) in a drop-jet mode, especially comprising a jet-nozzle mode. Fiber shaped products of the in-flight formation process may be provided in embodiments (comprising liquid jets) in a jet-jet mode, especially comprising a jet-nozzle mode. In yet other embodiments of the in-flight formation process products may be provided comprising a shape comprising fiber-like parts as well as round parts, e.g. resembling a pearl-lace. Especially, such shapes may be provided if an intact liquid jet collides with a modulated liquid jet (e.g. ejected from an actuated nozzle) that is not broken-up jet in separate droplets. Especially, such shapes may be provided in embodiments configured to arrange the collision point so that the length of the modulated liquid jet stream (L), i.e. a minimum length of a line connecting the collision point and the origin (upstream side) of the modulated liquid jet (such as the opening of the liquid providing device), is smaller than $L_B$, and especially larger than $0.1*LB$, such is in the range of $(0.5-0.99)*LB$, especially in the range of $(0.9-0.99)*LB$. Hence, in embodiments, one of the liquid jets is modulated and the collision point is configured such that said liquid jet is an intact, uninterrupted modulated liquid jet at a location upstream of the collision point up to the collision point, at the collision point the modulated liquid jet comprises a variable width in a direction perpendicular to the modulated liquid jet direction. Especially, in such embodiments a product of the in-flight formation process is provided having an elongated shape comprising a repeating variable width pattern in a direction perpendicular to a longitudinal axis of the product obtainable by the in-flight formation process.

Between different embodiments wherein L<LB, the shape of the product of the in-flight formation process may vary greatly. In embodiments wherein L<<LB, substantially elongated products of the in-flight formation process comprising a substantial homogeneous width may be provided. In embodiment wherein L/LB is selected in the range of 0.1-0.5, products of the in-flight formation process may be provided having an elongated shape wherein the width of the particle may vary only slightly in the longitudinal direction of the particle, and wherein especially a repetition of the changing width is provided in the longitudinal direction. In embodiments wherein L is configured almost equal to LB, especially wherein $0.95<L<LB$, a product of the in-flight formation process may be provided having a shape comprising a series of interconnected round droplet shapes (comparable to a pearl-lace).

Especially, the shape may be controlled by the (relative) location of the collision point (with respect to the location of breakup of the jet), when instabilities become more prominent in the downstream direction. Hence, in embodiments, a product of the in-flight formation process comprising a determined shape may be provided by selecting the ratio $L/L_B$ in the range of 0.5-0.99. In other embodiments, the location of impact is selected to configure L>LB, to provide substantially round products of the in-flight formation process.

Additionally, the shape and the size of these products may be controlled by other operating conditions and liquid properties. With respect to the former, the shape may be controlled by the velocity of the different liquid jets, the size of the nozzle or opening of the different liquid generating devices (generating the jets), the mutual angle, the possible modulation (especially the frequency and/or type of modulation) of the devices (especially the liquid generating devices, especially the nozzle), the distance between the contact point and a receptor element, etc. With respect to the liquid properties, parameters affecting the shape may be the surface tension, the viscosity and the density of the liquid materials, especially the surface tension of the liquid materials (see below). Furthermore, the liquid solidification properties (such as thermal solidification or freezing, precipitation, or chemical or physical reactions between two or more ejected liquids) may be controlled to change the post-solidification shape.

Especially, in embodiments comprising the drop-jet mode, the product of the in-flight formation process may comprise substantially round particles or droplets that may be provided if the liquid jet velocity of the first liquid jet and the jet velocity of the second liquid jet are substantially equal at the moment of impact (at the collision point). Especially, in further embodiments comprising a jet-nozzle mode (and the drop-jet mode), the product of the formation process may comprise substantially round particles or droplets that may be provided if a (volume) flux (flow) of the first liquid jet and a (volume) flux (flow) of the second liquid jet are substantially equal at the contact point. In these embodiments, the size of the (coalesced) third material is especially affected by the size of the nozzle opening ejecting the (modulated) liquid jet. For the indirect contacting formation process, the size of the (coalesced) third material may especially be affected by the nozzle opening (of the nozzle providing a liquid jet and being impacted by the other liquid at the nozzle face). A desired size of the product of the in-flight formation process, e.g. particles or droplets, may depend on the further application of the coalesced material. Especially, the size of the respective nozzle opening (generating the modulated liquid jet and the droplet train) may be selected in range of 0.1 µm-5 mm, such as 0.1 µm-1.5 mm, especially 1 µm-1 mm. In other embodiments, the size of the (respective) nozzle opening may be selected in the range of 0.05 µm-500 µm, such as 0.5 µm-250 µm, especially 1 µm-250 µm. Additionally, the size of the droplets in the droplet train at the location of the collision point may be affected by a degree of modulation of the liquid jet. Especially, the frequency of the (modulating) actuator may be selected to configure the size. Herein a frequency may also comprise more than one frequency, especially providing multiple frequencies by a (modulating) actuator may result in merging of products (droplets) after the collision point, especially further allowing to control the final product (size). The size of the particles or droplets provided with the production process may be proportional to the size of the droplets in the droplet train. Hence in embodiments, the size of a nozzle opening may be selected to configure the size of the particles. Additionally, the modulation of the respective liquid jet may be selected to configure the size of the particles. The size of the other nozzle opening may especially be selected to configure the layer thickness of the outer part of the product of the in-flight formation process. In embodiments of the device one or more of a size of the first device opening and a size of the second device opening is controllable. Especially different nozzle opening sizes and actuation (frequencies) may be selected to create janus particles (see further below) using more than two liquid jets.

Especially eccentric or elongated particles may be provided in embodiments wherein the ratio of the uninterrupted jet velocity and the other liquid jet (the droplet train) velocity $\geq 1.3$. Especially, the ratio may be selected to be less than 5, such as at maximum 2.5. At larger ratios the (coalesced) third material may break because of the impact of the intact liquid jet, larger ratios may also cause initially separated droplets to be re-connected by the faster jet, especially such that a fiber is formed. For ratios <1.3 the provided coalesced (third) material may comprise a substantially round shape. In embodiments, the first liquid jet velocity and the second liquid jet velocity are substantially the same.

The said surface tension difference between different ejected liquids especially enables encapsulation of high surface tension liquids by those of lower surface tension. Especially, the surface tension of a liquid material may be configured by adding a surface tension modifier. Examples of such surface tension modifiers are alcohols such as methanol, ethanol, (iso)propanol, (poly) ethylene glycol (PEG), detergents, soaps solvents, biomolecules (i.e. proteins, DNA, etc.), nano/micro particles, perfluorocarbons, polymers, etc. Hence, in embodiments the composition of the first liquid material and the second liquid material is substantially the same, wherein the one of the liquid materials constitutes of the other liquid material with an additional small amount of ethanol to control the surface tension. Especially in such configuration, one of the liquid materials may comprise 0.1-70 vol. % ethanol, such as 0.5-25 vol. % ethanol, especially 0.5-10 vol. % ethanol. Especially 0.5-1.5 vol. % ethanol may already be sufficient to provide a surface tension difference allowing the one of the liquid materials to encapsulate the other liquid material. Yet in other embodiments, the difference between the first liquid material and the second liquid material may be provided by a fraction of polyethylene glycol, such as 1-25 vol. %, especially 5-20 vol. %. Hence, in further embodiments, one of liquid comprises the other liquid (material) plus an added surface tension modifier, especially wherein the difference in composition between the two liquid is only the presence of the surface tension modifier. Especially, by using a surface tension modifier an increase or a decrease of the surface tension of one of the liquids may be controlled, especially allowing one of the liquids to encapsulate the other liquid.

Alternatively or additionally, at least one of the liquid materials may especially comprise (a surface tension modifier as) a functional material such as biological cell material, e.g. stem cells, proteins and DNA, to be comprised in the third material, especially to provide materials with a structural hierarchy (see further below). Especially droplets or particles of at least 10 µm may be suitable for cell-containing materials. Especially, the process allows encapsulation of (biological) cells. In embodiments the process comprises encapsulation of single cells. In further embodiments, the process comprises the encapsulation of multiple cells.

In yet other embodiments, two immiscible liquids are coalesced (in the gas atmosphere) to enable encapsulation of the high surface-tension material. For instance, water and a liquid of lower surface tension such as a liquid comprising oil or fluorocarbon are coalesced. In other configurations, encapsulation with or without solidification is achieved using different ejected liquids with different viscosities or sizes.

The location and the degree of solidification may be controlled by physical as well as chemical parameters. Moreover, especially the composition of the different liquid phases as well as the final composition of product of the in-flight formation process, the rate of solidification, and other physical parameters like the temperature of the gaseous atmosphere, and radiation may be selected in embodiments. Especially, the solidification may be induced by a reaction between agents in the first liquid material and the second liquid material, especially providing a network. Hence, in embodiments the first liquid material and second liquid material are selected to react with each other. Especially, the first liquid material and the second liquid material may be selected to physically, chemically, or biologically interact, especially react, with each other. In further embodiments one or more of the first liquid material and second liquid material comprise a solidifier, especially a cross-linker, for the other liquid material. Especially a solidifier comprises at least one solidifier. A solidifier may refer to one solidifier in the first liquid material or the second liquid material. It also may refer to at least one solidifier in both the first liquid and the second liquid. It may especially refer to a solidifying complex, wherein (at least) one element of the complex is comprised in the first liquid material and the remainder of the complex is comprised in the second liquid material. After combining the first and the second liquid material, the solidifying complex may be formed by the interaction between the first liquid material and the second liquid material. Especially, a solidifier comprises a cross-linker. Especially also a cross-linker comprises at least one cross-linker (complex). The first liquid materials, e.g., may comprise a first part of the cross-linker (complex) and the second liquid material comprises the remainder of the cross-linker (complex). In yet further embodiments, encapsulation of one liquid by the other liquid material is provided by a difference (between the liquid materials) in surface tension or by a viscosity gradient, and especially at least one of the encapsulated liquid and the encapsulating liquid is solidified.

In an embodiment with three liquid jets, the materials of the first liquid jet and the second liquid jet may be combined in various ways prior to impact (at a second collision point) with the fourth liquid jet. For example, the first liquid jet (the first liquid material) may be of lower surface tension than the second liquid jet (the second liquid material) to encapsulate the second liquid jet (the second liquid material), after which one or both liquids are solidified by the fourth liquid jet (the fourth liquid material) configured with a lower surface tension than the first and the second liquid jets (materials). In embodiments, collision of the first liquid jet and the second liquid jet (in a drop-drop mode or a drop-jet mode) providing the third material, that successively may collide with the fourth liquid jet, core-shell particles may be provided having one or more concentric shells that may or may not solidify (depending on the material properties). Such core-shell particles may also be provided in further embodiments, wherein the first liquid material and the second liquid material contact each other at a contact point (of an indirect contacting formation process) providing the third material, that successively may collide with the fourth liquid jet. In other embodiments wherein the three jets are uninterrupted jets, (partly) solidification may provide concentric fibers. Alternatively, the first liquid jet and second liquid jet (the first and second liquid material) may be selected to have an equal surface tension, and especially (after the first collision point) the third material (the third jet in the third direction) may comprise a "janus" jet. Such janus jet (the third jet) e.g. comprises a cylinder-shape, in which a part (of the volume of the jet) comprises the first liquid material and another part (comprising the remainder (of the volume)) comprises the second material. These (coalesced) parts are separated (partitioned) by a (flat) interface (that may or may not be substantial parallel to the third direction (a longitudinal axis of janus jet)). A further liquid jet, a fourth liquid jet having a low surface tension may be directed to impact (at the second collision point) the third jet before or after break-up of the third jet. If the further (fourth) liquid jet impacts prior to break-up, a janus fiber may be provided. If the further (fourth) liquid jet impacts after break-up, janus particles may be formed, especially comprising two distinguishable parts, especially two half-spheres that consist of different materials, see e.g. FIG. 3. Especially, by selecting alternative combinations of surface tensions, viscosities, densities, or solidification properties, a wide range of particle or fiber shapes may be produced. In embodiments, especially for providing janus particles, three jets may be provided (especially a first, a second, and a further liquid jet). Especially, in such embodiments, the first liquid material and the second liquid material have substantially the same equal surface tensions, especially wherein the further liquid material may have a surface tension different (especially lower) from said surface tension (of the first and/or second material)

Especially, multiple jets may be pointed at a main jet from different directions or at different impact locations, for example for scaling-up of the production process. For example, pointing 3 streams of water with alginate droplets at a single, thicker jet consisting of water, ethanol, and $CaCl_2$ may enable a triple production of cross-linked alginate particles. Even further, multiple immiscible jets may enable formation of particles with multiple liquid or solid shells, for example by formation of a core-shell particle that impacts onto a further liquid jet of even lower surface tension and is coated again—this procedure can be repeated multiple times in order to create multiple shells.

Especially the term "main jet" may (also) be related to a (main) jet comprising a plurality of jets, especially comprising a changing composition in a longitudinal direction: starting upstream with a main jet comprising a first jet, a second jet may contact the main jet providing a third jet, hence providing the main jet to comprise the third material (provided by the first jet material and the second jet material). Next (further downstream) providing a further jet to contact the (main jet) comprising the third material may provide a jet comprising the forth material. Especially, said jet may also be referred to as main jet (further downstream of the main jet comprising only the third material), etc. Hence a main jet may "grow" in its longitudinal direction. Especially a device opening may provide the origin of a main jet, especially the downstream side of the main jet may substantially coincide with the product of the formation process.

In further embodiments, a plurality of second jets (a second jet comprising a plurality of second jets) comprising a second liquid material are impacted at the (same) collision point at a first jet (such as a main jet) comprising a first liquid material, wherein the first jet comprises a cross-linker for the second liquid material. In such embodiments a plurality of fibers may be provided parallel to each other (each fiber related to one (or a number) of the second jets). Especially by selecting the surface tension of the first liquid material lower than the second liquid material, fibers may be provided. Especially in such embodiment, the first liquid (jet) may function as a depot (storage) comprising first liquid material comprising cross-linker material, wherein the first liquid material may envelop (a) second liquid jet(s) and may solidify the second liquid jet(s). Further embodiments comprise twining. Twining may for instance comprise spinning or twisting the (solidified) second liquid jets, especially to provide spun fibers. Especially embodiments wherein a second contact point and optionally any further contact point coincide(s) with a first contact point may comprise twining.

An increase in liquid viscosity of the inner and outer liquid (such as of the main jet and of the plurality of jets) may affect a Marangoni-driven flow. This surface-tension driven encapsulation may not always be fast enough to cover (encapsulate) a droplet for high viscous liquids. Increasing the number of jets may further provide an encapsulation where Marangoni-driven flow is insufficient. Hence, in a further embodiment the first and second liquid material comprise a viscous material, having a viscosity e.g. in the range of equal to or larger than 10 mPa·s, especially equal to or large than 100 mPa·s, even more especially equal to or larger than 1 Pa·s. Especially in such embodiment a plurality of (second) jets (comprising the second liquid material) may be impacted at a (the same) collision point at a main jet (comprising the first liquid material), especially comprising a droplet train.

In yet further embodiments, especially related to the combined formation process the plurality of jets are impacted at the main jet at a plurality of collision points distributed in an axial direction of the main jet. In further embodiments, the plurality of jets may point at a different location at the main jet (collision points), especially wherein the collision points are positioned at the main jet, especially not at a center of the main jet. The impact of the multiple jets may provide a small impact on the main jet. Especially in such embodiments the impact may provide a rotation of the main jet, allowing e.g., to provide twisted fibers, such as comprising a coil-shape, such as a DNA-type of coil shape.

In embodiments comprising a plurality of (second) jets, a product comprising a plurality (optionally the same) layers may be provided, e.g. when the surface tension of the first liquid material is smaller or equal to the surface tension of the second liquid material. Especially embodiments comprising a plurality of (second) jets may easily be scaled-up.

In an embodiment the first liquid material comprises water with calcium chloride and the second liquid material comprises water with ethanol and alginate to provide particles comprising water encapsulated by water/ethanol. In the gaseous atmosphere the particles solidify when the calcium chloride migrates (diffuses) from the inner part towards the alginate in the outer part, providing particles comprising a liquid inner part and a solidified outer part, because the alginate solidifies when merged with $CaCl_2$.

In embodiments, the inner part comprises a core, and the outer part comprises a shell. Especially the particles described herein comprise a core and a shell.

Especially, one or more of the first liquid material and the second liquid material are solidifiable. Solidification may be a time consuming process. Hence, particles (or parts of particles, such as the core or the shell) may only be partly solidified right after collision, whereas after a period of time, the solidification may only have completed. Especially, if the solidification in the shell is not completed yet, the production process may provide the product of the (in-flight) formation process comprising particles that may fuse together when they are collected in a collector or, e.g., deposited on a surface (see also below) and contact each other. In embodiments wherein the particles are collected in a (collecting) liquid, an emulsion may be provided. Hence, in embodiments of the production process, the particulate material comprises an emulsion, especially wherein the particles are collected in a (collection) liquid. Especially said liquid does not dissolve the particles. Hence, in embodiments, the product of the in-flight formation process comprises a liquid material, wherein the process comprises receiving said product of the in-flight formation process in a liquid phase with which the product of the in-flight formation process is not miscible. In embodiments, the receptor element comprises a liquid. For instance, in this way also a dispersion may be provided as (intermediate) product.

Hence, in embodiments, the product of the formation process comprises a liquid material, and the process comprises receiving said product of the formation process in a liquid phase with which the product of the formation process is not miscible. In other embodiments, the process comprises receiving said product of the formation process in a liquid phase with which the product of the formation process is miscible. Especially, the process comprises receiving the product of the process and/or the coalesced (third) material in a liquid phase. In yet other embodiments, the process comprises receiving the product of the formation process on to a solid phase, especially wherein the product of the formation process comprises a liquid material.

In embodiments, the product of the formation process and the coalesced third material are the same. In further embodiments, the product of the formation process comprises a further coalesced material, such as a fifth coalesced material.

Yet in further embodiments, one liquid material comprises a first active agent that can diffuse from the outer part into the inner part, and the other liquid material comprises a second active agent that can diffuse from the inner part to the outer part, wherein a particle that is solidified in the outer part and in the inner part may be provided. Alternatively or additionally the production process may comprise agents in one or more of the liquid materials that may react under the influence of emitted radiation, such as light, especially UV-light, and providing radiation to the coalesced material to solidify the material. Additionally or alternatively, the first and second liquid material phase may comprise enzymatically active agents or initiate either physical solidification (e.g., by temperature, precipitation, drying, etc.) or chemical solidification (such as photoinitiated, supramolecular complexation, covalent binding, enzyme-mediated, etc.). Especially, if a reaction between two agents, such as the enzymatic reaction, is a slow reaction, it may be advantageously if the liquid materials (also) comprise other agents. Especially, the other agents may provide a (first) solidification and immobilization. Especially in such system the former reaction successively may proceed in the already (partly) solidified particle. In embodiments wherein cross-linking may be enzyme-mediated, cross-linking (and solidification) may be affected by the enzymatic activity. Especially such enzymatic activity, may be controlled by (controlling diffusion of) essential co-factors, e.g. hydrogen peroxide for peroxidase or $Ca^{2+}$ in relation to factor XIII Hence, in embodiments cross-linking may be controlled by a controlled use of cofactors. In embodiments, cofactors may easily diffuse from one phase to the other.

In yet further embodiments, the products of the in-flight formation process are levitated, especially to extend the period to allow solidification (before received at a receptor element) or any other reaction. Especially levitation may be provided by directing a gas in a direction opposite to the gravity. Levitation may also be provided by other forces, e.g. electromagnetic forces. In further embodiments a distance between the contact point and the receptor is element is configured adjustable. Especially by configuring said distance a (degree of) solidification may be provided. In other embodiments, (a degree of) encapsulation is provided by configuring said distance. Said distance may further provide a shape of the product of the formation process. Especially a long distance between the contact point and the receptor element may provide a third (or further) material breaking up before contacting the receptor element.

Especially a jet comprising the coalesced (third or further) material may also comprise a breaking length (LB). In embodiments, the distance between the contact point and the receptor element is selected to be larger than said breaking length. In embodiments said distance is configured to be smaller than said breaking length. In further embodiments said distance is selected to be less than or equal to 50% of said the breaking length. The latter embodiments may e.g. provide fibers comprising a straight configuration.

In embodiments the product of the (in-flight) formation process comprises a core-shell material. Especially such embodiments may be advantageously being combined with embodiments wherein the production process comprises receiving said (core-shell) product of the in-flight formation process in a liquid phase which is a solvent for the shell. Such embodiment may also advantageously be combined with embodiments wherein the production process comprises receiving said (core-shell) product of the in-flight formation process in a liquid phase which is a solvent for the core. Especially the first combinations allow the production of material that may benefit from a temporary immobilization (by the shell). Especially the latter combination of embodiments may allow the production of porous material.

In further embodiments, the first liquid phase may comprise a first active agent that may react with a second active agent, wherein the second liquid phase comprises said second active agent, and at least one of the liquid phases comprises a third active agent that may react with a forth active agent comprised in a collector or at a receptor element. Especially in such an embodiment (partly) solidified particles may be provided and collected in the collector (at the receptor element), wherein a further reaction between the third active agent and the second active agent may take place in the collector, providing a further network. In further embodiments, the first and second active agents may be removed again from the particulate material, e.g. by dissolving the active agents. An example of such embodiment is an embodiment wherein a droplet train comprises an alginate and a synthetic or natural polymer conjugated with tyramine residues produced in a production process to generate these materials (known to a person skilled in the art). (An example of such material is dextran conjugated with tyramine.) When such droplet train of alginate with dextran-tyramine is impacted by a liquid jet comprising $CaCl_2$ to provide particles (and hence solidify because of the alginate—$CaCl_2$ interaction), and wherein these particles are collected in a liquid comprising a crosslinking agent for dextran-tyramine to form an interpenetrating network of alginate and dextran-tyramine, and wherein subsequently the alginate from the particles is dissolved using a calcium chelator, particulate material comprising a dextran-tyramine micro gels may be provided. Especially such templating approach enables oil-free production of complex-shaped micro-particles of arbitrary hydrogels. Especially, such process comprises receiving the product of the formation process in a liquid phase with which the product of the formation process is miscible, especially providing a further product (of the formation process). Additionally, an in-air solidying shell may be used to maintain a distinct solid precursor spherically shaped after collection (i.e. a core shell comprising an "in-air" formed shell). Hence, the properties of the receptor may control the configuration of the product of the formation process. In embodiments, the coaleced (third or further) material is received in a bath, especially in a bath comprising a receptor liquid. Especially, the properties of the receptor liquid may define the final product properties. For instance relevant properties may be the chemical composition of said liquid, the surface tension of said liquid, the temperature of said liquid, the viscosity of said liquid, etc. Especially the properties of said liquid may determine a degree of interaction with the coalesced (third or further) material received in said liquid.

In yet other embodiments the outer part (of the core-shell (in-flight) particles or fibers) immobilizes the inner part, wherein neither the outer part, nor the inner part may solidify. In embodiments, e.g. one liquid material comprises oil (and a surfactant lowering the surface tension) and the other liquid material comprises water. Especially such embodiments may provide coalesced material comprising droplets comprising an aqueous inner part and an oily outer part. Advantageously, these droplets may be collected in a liquid, especially in an aqueous liquid, to provide a double emulsion. Hence, in embodiments, the production process provides a double emulsion, especially a water/oil/water emulsion.

The production process and device described herein may especially be advantageous for the generation of complex 3-dimensional bodies. In embodiments, the device comprises a receptor element configured to receive a product of an in-flight formation process, especial executed with the device as described herein. As described above different particles may be generated comprising a solidified core and/or a solidified shell. Solidification may be complete in embodiments when the particles are collected. In other embodiments solidification may not yet be complete when the particles are collected. Especially, by configuring the distance between the contact point and the receptor element a degree of solidification may be provided. Especially, these different characteristics allow the generation of materials with a structural hierarchy, which can be realized in various architectures, especially in embodiments comprising deposition of (or receiving) the coalesced material at a substrate or in a mold. In embodiments, the production process comprises receiving said product of the in-flight formation process in a mold. In other embodiments, at least part of the product of the in-flight formation process solidifies during propagating to a solid or semi solid, wherein the production process comprises receiving said product of the in-flight formation process at a receptor element, especially a substrate. In embodiments, a core of a core-shell particle may at least partly be solidified when receiving the particle at or in a substrate or receptor element (including a mold). Alternatively or additionally a shell of a core-shell particle my at least be partly solidified when receiving the particle at or in a substrate (including a mold). In further embodiments, the product of the formation process is substantially in a liquid phase when received or deposited at a substrate, and especially said product may solidify at the substrate. Especially, a receptor element comprises a substrate or a mold.

In embodiments, products of the in-flight formation process, especially fibers, are deposited into a mold, providing a particulate material comprising a shape of a mold. In other embodiments the products are deposited at a substrate, wherein the position of the substrate is changed in time to provide a determined shape of the final product material. In further embodiments a plurality of jets is impacted at the same collision point, allowing to direct the third direction, especially to provide a determined deposition location of the product (at the substrate). Especially, by selecting a specific composition of the first and/or the second liquid material, in such embodiments particles may be provided comprising a partly solidified shell that may fuse together after deposition at the substrate or receptor element. Especially, a receptor element may comprise a substrate and/or a mold and/or a collector and/or a collector surface.

Hence, in embodiments the production process comprises depositing the particulate material at a depositing surface to provide the product comprising a three dimensional body, or a two-dimensional shape, e.g. for coating a further material. In further embodiments, the depositing surface is arranged (in time) relative to one (or more) of the liquid generating devices, especially to provide a shape of the three-dimensional object (or a two-dimensional shape, especially to coat another surface or another 3D body). In embodiments a device positioning system is configured to arrange the receptor element relative to one of the liquid generating devices to generate the three-dimensional body (from the product of an in-flight formation process, such as a particulate material, fibrous material, droplets, etc.). Especially, a receptor element, selected from the group consisting of a mold and a substrate is moved during in-flight formation process for 3D-printing a 3D-printed object, for patterning, or e.g. for coating a surface. Yet further embodiments, configured for 3D-printing a 3D-printed object, for patterning or coating a surface, further comprise an actuator configured to move the receptor element, selected from the group consisting of a mold and a substrate, during execution of the in-flight formation process. Especially, to deposit (or receive) the product of an in-line formation process at a determined location, the location may be moved relative to the remainder of the device. Hence, e.g., also the device opening may be repositioned while not moving the receptor element. In other embodiments the receptor element as well as other parts of the device are moved to receive the product at a determined location. The receptor element may be actuated. It is further understood that especially the properties of the receptor element may define a configuration of the (3D) printed object. The configuration may e.g. be provided by a surface topography of the receptor element. In other embodiments, the configuration of the printed object is configured by a charge or the temperature of the receptor element. In further embodiments, adhesive characteristics or repulsive characteristics of a combination of the receptor element and the coalesced (third or further) material is selected to provide a configuration of the product of the formation After deposition, further processing may be applied, including heating (including a (partial) melting), washing, drying, etc.

In embodiments, the device is a handheld device, especially facilitating the 3D-printing process. In a further embodiment, the device is a handheld device, especially configured for in situ, especially in vivo, printing of a 3D-body.

In embodiments comprising the drop-jet mode particles comprising a dense suspensions or emulsions deposited on the depositing surface are provided. Here especially the high throughput of IAMF is expected to be a key benefit.

Injectable shape-stable bodies comprising a structural hierarchy may be generated by combining a rapidly solidifying core and a slowly solidifying shell. Especially, after dispositioning, particles or fibers are fused by their still-liquid shell, which solidifies only after a stationary situation is reached at the dispositioning surface. These injectable bodies may have a well-controlled microstructure and can be readily employed to fill a cavity. Such an approach is highly relevant for filling molds or defects, such as (focal) cartilage defects (cartilage repairs) or skin wounds, but also for injection molding e.g. in-air mixed plastics. Furthermore, post-impact solidifications also aids e.g. smooth coating. Alternatively, constructs with a wide range of shapes and surface finishes can be produced by loosening these constructs from a pre-defined mold. IAMF thus enables the production of solid hierarchical constructs in virtually arbitrary shapes, similar to existing casting techniques.

By introducing a rapidly solidifying shell and using a non-solidifying core, porous, liquid-filled structures can be deposited in one step. Microfluidic approaches to make such monodisperse foams may normally require to first form and subsequently solidify a porous structure, which is a highly non-trivial and relatively slow process. In contrast, IAMF allows high-throughput deposition of each pore in a pre-defined shape. Therefore, IAMF may aid studying the elasticity and failure of these closed cell, fluid-filled, solid foams, which have a geometry similar to fruits and vegetables. In general, fluid filled solid foams recapitulate the structure of natural materials. Also extracellular matrix of native animal tissue.

Finally and most importantly, one-step printing (deposition) of hierarchical, free-standing solid structures may be achieved by combining a rapidly solidifying shell and a slowly solidifying core. In such embodiments, the shell of the particles already partially solidifies in-air and therefore maintains its shape upon dispositioning at the surface, to constitute a 3D body. Especially, one-step printing may comprise a plurality of (second) jets directing a location for depositing a product. Especially one-step printing may comprise a plurality contact points (especially collision points) that coincide directing a location for depositing a product. In embodiments, the formation process comprises one-step printing. Especially in such embodiments, the product of the formation process is deposited onto a solid phase, especially a solid material, such as a plate, or in a cup or container, a table (of an apparatus), or any other type of receptor element.

In embodiments of the method and device, especially multiple jets may further be integrated in state of the art droplet and/or jet based methods and devices. For instance a liquid jet may be configured at FACS or inkjet printing to provide an IAMF compatible device. Embodiments of the device and the method may (further) be used in one or more of the applications selected from the group consisting of cell spraying in endoscopic procedures, pesticide applications, spray coating applications, (commercial) production of oil-free core-shell particlesm, rapid printing of 3D multi-component materials or materials with hierarchical morphologies (such as biological tissues), (commercial) production of monodisperse foams, and production of liquid/liquid or solid/liquid emulsions in food (such as mayonnaise or milk), cosmetics (cream, shampoo), and pharmaceutics, especially related to an improved droplet or particle size-control and optional particle shape-control.

BRIEF DESCRIPTION OF THE DRAWINGS

Embodiments of the invention will now be described, by way of example only, with reference to the accompanying schematic drawings in which corresponding reference symbols 20 indicate corresponding parts, and in which:

FIGS. 4A-4E, 5A-5C, 6A-6B, and 7-9 schematically depicts some further aspects of the process and the device. Schematic drawings are not necessarily to scale.

DETAILED DESCRIPTION OF THE EMBODIMENTS

Figure 1:
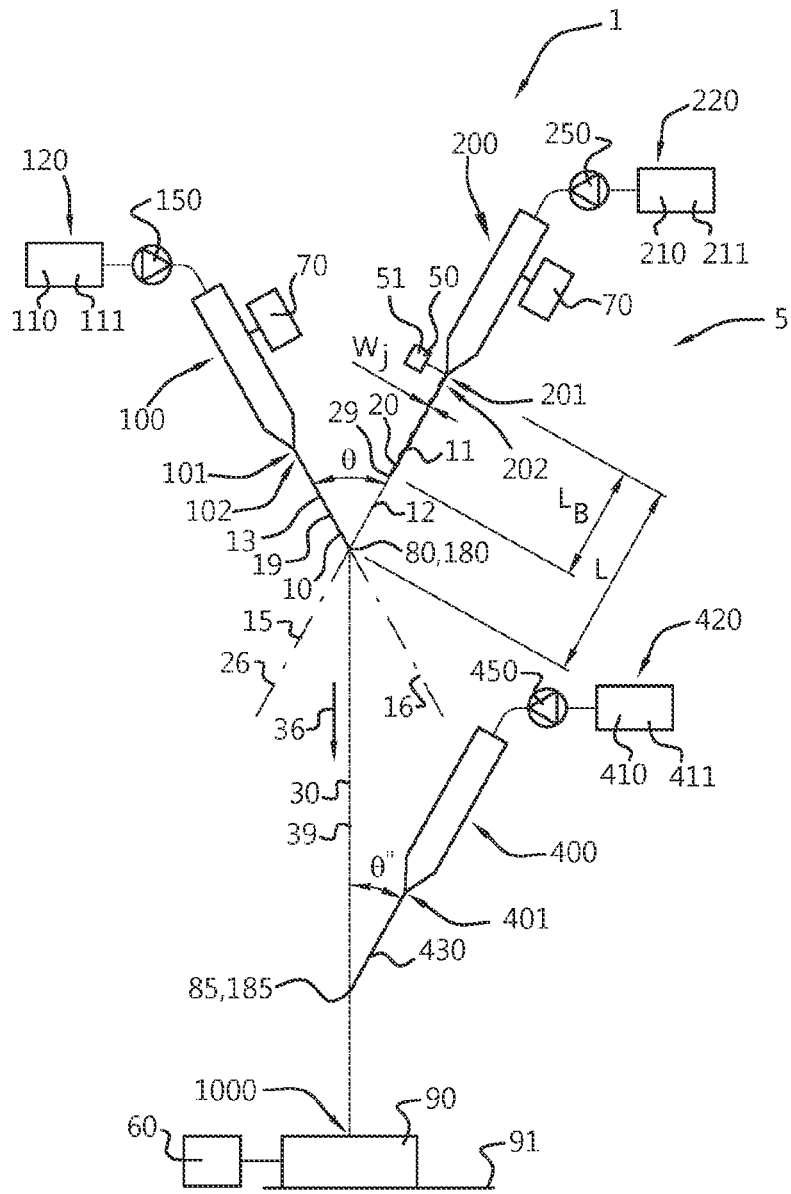
FIG. 1 schematically depicts an embodiment of the device.
Figure 8:
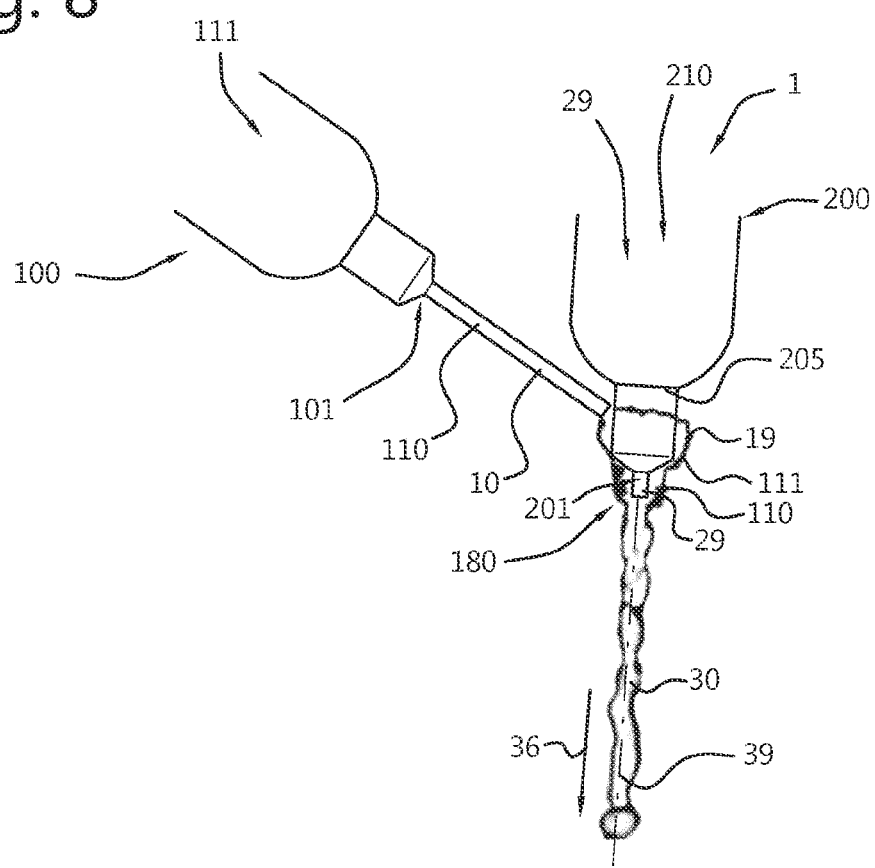

The production process and the device of the invention are explained referring to FIG. 1. and FIG. 8. FIG. 1 schematically depicts an embodiment of the device 1 ("apparatus") for a production process comprising an in-flight formation process. FIG. 8 schematically depicts an embodiment comprising an indirect contacting. For the formation process, these embodiments may be combined, see e.g. FIG. 6. The formation process of the invention comprises contacting a first liquid material 19 and a second liquid material 29 with each other at a contact point 180 in a gas atmosphere 5, wherein at the contact point 180 at least one of the first liquid material 19 and the second liquid material 29 is provided as a liquid jet propagating in a direction, to provide at the contact point 180 a coalesced third material 39 propagating in a third direction 36. The coalesced third material 39 especially provides a third liquid jet 30. Hence, especially the first liquid jet 10 and the second liquid jet 20 do not atomize, or provide a mist or a screen comprising the third material 39. Especially, the first liquid jet 10 and the second liquid jet 20 provide a further jet, the third liquid jet 30, when colliding. Especially, the first liquid material and the second liquid material do not bounce at the collision point 80.

As is schematically depicted in In FIG. 1, a product 1000 is produced in the gaseous atmosphere 5. The device 1 comprises a first liquid container 120 comprising a first device liquid 110, comprising a first device liquid material 111 and a second liquid container 220 comprising a second device liquid 210 comprising a second device liquid material 211. In the given embodiment, a first device liquid jet 10 is provided by a first liquid transporter 150 configured to transport the first device liquid 110 from the first liquid container 120 to a first liquid providing device 100 and through a first device opening 101 in the first liquid providing device 100. A second device liquid jet 20 is provided by a second liquid transporter 250 configured to transport the second device liquid 210 from the second liquid container 220 to the second liquid providing device 200 and through a second device opening 201 in the second liquid providing device 200. In other embodiments only one of the (device) liquid materials is provided as a jet. The first liquid providing device 100 and the second liquid providing device 200 are especially arranged to allow the first device liquid material 111 and the second liquid device material 211 to contact each other at the contact point 180. Especially, the first device opening 101 and the second device opening 201 are directed to the contact point 180 comprising a (virtual) collision point 80. In the depicted embodiment the first device 101 opening and the second device opening 201 are directed to the (virtual) (first) collision point 80, in line of sight of both device openings 101, 201, wherein the device openings 101, 201 and the (virtual) (first) collision point 80 define an angle ($\Theta$) larger than 0° and especially equal to or smaller than 45°. In the depicted embodiment, the contact point 180 is remote from the device openings 101, 201. Yet in other embodiments, comprising an indirect contact formation process (see FIG. 8) the contact point 180 is configured substantially at one of the device openings 101, 201. It is noted that a contact point or a collision point 80 may not be a distinct 1-dimensional point. A contact point 180 and a collision point 80 as described herein may comprise a small volume V wherein the liquid materials/jets contact each other. A virtual contact point may be a distinct 1-dimensional point. However if liquid material "arrives" at such distinct point a small volume will be comprised by the liquid materials contacting each other. Such a volume V is schematically and exaggeratedly depicted in the FIG. 6.

One or more of the device openings may be a coaxial device opening, which may be used to provide a coaxial jet of two fluids, especially two different fluids, of which at least one fluid is a liquid.

The device liquid jet 10 comprises an uninterrupted, intact jet 13. The device liquid jets 10, 20 may also comprise a modulated jet 11, schematically depicted by the second device liquid jet 20. Liquid jets especially may break up after a certain jet breaking length LB. A modulated jet 11 may break up more easily. To facilitate break-up, the device 1 may comprise one or more (modulating) actuators 50 configured to provide one or more of a modulated first device liquid jet 10 and second device liquid jet 20. The actuator 50 may comprise an element 51 configured to vibrate, also referred herein as a "vibrating element" 51. In the embodiment depicted in FIG. 1 the device 1 comprises one (modulating) actuator 50 that provides a modulation of the second device liquid jet 20, as may be observed from a variable width Wj in a direction perpendicular to the respective jet direction 15, 26. The modulated jet 11 breaks up at the breaking length LB. In the depicted embodiment this breaking length LB is shorter than the length L of the jet at the (virtual) (first) collision point 80, i.e. the distance L from the respective device opening 201 to the virtual collision point 80. Especially, for a third jet 30, the length L of the jet may be defined as the distance between the (first) contact point 80 to the end of the jet 30, being the second contact point 185 (see below) in the depicted embodiment. In other embodiments the coalesced third material 39 is directly received by a receptor element 90 and the length L of the third jet may be defined by the distance between the contact point 80 and the receptor element 90. Especially, in such embodiment the respective device liquid jet 20 comprises droplets (i.e. a droplet train 12) at the location 80 of impact (the (first) collision point 80) with the first device liquid jet 10. The liquid providing devices 100, 200 in the present embodiment may be configured to control the position 102 of the first device opening 101 and/or the position 202 of the second device opening 201 to control (the location of) the collision point 80 relative to the positions 102, 202 of the respective device openings 101, 201. This way the angle $\Theta$ between the first device liquid jet 10 and the second device liquid jet 20 may be configured. This way also the ratio LB/L may be configured. Between different embodiments wherein L<LB, the shape of the product produced with the device 1 may vary greatly. In embodiments wherein L<<LB, substantially elongated products of the in-flight formation process comprising a substantial homogeneous width may be provided. In embodiment wherein L/LB is selected in the range of 0.1-0.5, products of the in-flight formation process may be provided having an elongated shape wherein the width of the product 1000 may vary only slightly in the longitudinal direction of the product 1000, and wherein especially a repetition of the changing width is provided in the longitudinal direction, see e.g. FIG. 3. In embodiments wherein L is configured almost equal to LB, especially wherein $0.95<L<L_B$, a product 1000 may be provided having a shape comprising a series of interconnected round droplet shapes (comparable to a pearl-lace), see e.g. FIG. 4. In this embodiments, the device 1 especially is configured to provide one of more of said modulated first device liquid jet 10 and second device liquid jet 20 with the respective jet 11 breaking into subunits after a breaking length LB determined from the respective device opening 101,201, wherein the breaking length LB is shorter than L. Especially the device 1 may comprise one or more actuators 70 configured to control one or more of the position 102 of the first device opening 101 and the position 202 of the second device opening 201.

In embodiments of the device 1, such as the one depicted in FIG. 1, the device further comprising a fourth liquid container 420 configured to contain a fourth device liquid 410 comprising a fourth device liquid material 411, in fluid connection with a fourth liquid providing device 400 comprising a fourth device opening 401, a fourth liquid transporter 450 configured to transport the fourth device liquid 410 from the fourth liquid container 420 to the fourth liquid providing device 400 and through the fourth device opening 401 to provide a fourth device liquid jet 40. This fourth device opening 401 is directed to a second virtual collision point 85 downstream of the virtual first collision point 80. By providing the fourth device liquid jet 40, this liquid jet 40 may further collide with the product, i.e. the third material 39—in the third jet 30 in the third direction 36—provided by the collision of the first device liquid jet 10 and the second device liquid jet 20. Especially two in-flight formation processes are configured in series. In the depicted embodiment, the product 1000 of the in-flight process(es in series) is received at a receptor element 90, such as a substrate, a mold, or in other embodiments a bath comprising a liquid. In other embodiments comprising only two liquid device jets 10, 20, the receptor element 90 may be arranged at a different location. Especially, the device 1 may comprise actuator 60 configured to move the receptor element 90 (directly or indirectly) relative to the remainder of the device 1 (for clarity reasons, schematically only pictured in connection with the receptor element 90, however the actor 60 may also be connected to the remainder of the device 1). Hence either the remainder of the device and/or the receptor element 90 may be moved to provide the product 1000 at a determined position, e.g. to provide 2D or 3D product shapes. The receptor element 90 may also be moved to control a distance between the contact point(s) 180, 185, especially the second contact point 185 for the depicted embodiment. Especially by controlling said distance a process time of the formation process may be configured. Especially by selecting said distance, a determined configuration of the product 1000 may be provided. For instance a degree of solidification may be provided. Especially the receptor element 90 is configured on a table 91.

Referring to the same FIG. 1, the production process comprising an in-flight formation process may be explained. As already noted in the summary of the invention, the terms "first", "second", "third" and the like in the description and in the claims, are used for distinguishing between similar elements and not necessarily for describing a sequential or chronological order.

For instance, related to the top of the figure, the first liquid providing device 100 of the device 1 may comprise the first liquid material 19 or the second liquid material 29. The second liquid providing device 200 may e.g. comprise the first liquid material 19 if the first liquid providing device 100 comprises the second liquid material 29. Analogously, also the first liquid device jet 20 may be the first liquid jet, but alternatively the first liquid device jet 20 may be the second liquid jet, and vice versa. Especially in these configurations, the first liquid jet and the second liquid jet collide at the collision point 80, and the angle between the direction of the first liquid and the second liquid is the angle Θ. The figure, however, also depicts the process referring to other (device) jets, jet material etc.

For instance, the first liquid jet may also comprise the third jet 30 and the second liquid jet may be the fourth device liquid jet 40, wherein the first liquid jet and the second liquid jet collide at the (second virtual) collision point 85, and wherein the mutual angle between the direction of the first liquid jet and the second liquid jet is the angle Θ".

For clarity, in the depicted embodiment, the first liquid jet is the first device liquid jet 10, comprising the first liquid material 19, and the second liquid jet 20 is the second device liquid jet, comprising the second liquid material 29. Hence, also the first liquid jet may be referred to by reference number 10, and the second liquid jet is referred to by reference number 20. Further, this choice implies that the mutual angle between the first jet direction and the second jet direction is equal to the angle Θ defined by the first and second device openings 101, 201 and the virtual collision point 80. Hence also this angle is referred to by the reference sign Θ.

The formation process of the invention comprises contacting a first liquid material 19 and a second liquid material 29 with each other at a contact point 180 in a gas atmosphere 5. Especially, at the contact point 180 at least one of the first liquid material 19 and the second liquid material 29 is provided as a liquid jet propagating in a direction to provide a coalesced third material 39 at the contact point 180, especially propagating in a third direction 36.

Especially, the in-flight formation process of the invention comprises providing in a gas atmosphere 5 a first liquid jet 10 directed with a first jet direction 16 to a (virtual) (first) collision point 80 in said gas atmosphere 5, wherein the first liquid jet comprises a first liquid material 19, and a second liquid jet 20 directed with a second jet direction 26 to the collision point 80, wherein the second liquid jet 20 comprises a second liquid material 29 to provide a (coalesced) third material 39 at the collision point 80 propagating in a third direction 36; wherein the first jet direction 16 of the first liquid jet 10 and the second jet direction 26 of the second liquid 20 jet have a mutual angle Θ. Especially this angle Θ is larger than 0° and equal to or smaller than 45°.

Especially, the (production) process comprises providing at least one of the first liquid jet 10 and second liquid jet 20 as uninterrupted liquid jet 13 at said collision point, see FIG. 1. In a jet-jet mode (not shown), also the other liquid jet 10, 20 is provided as an uninterrupted liquid jet 13 at the collision point 80. In a drop-jet mode as shown in FIG. 1 one of the liquid jets 10, 20 comprises a droplet train 12 at the location of impact 80. Especially, the production process may comprises modulating one of the first liquid 10 and the second liquid jet 20 for providing one of these jets as interrupted liquid jet 12 at said collision point 80. Especially, modulating a liquid jet may comprise providing a vibration to that jet. In a drop-drop mode (also not shown) both liquid jets 10, 20 comprise a droplet train 12 at the collision point 80.

Especially the first liquid material 19 and second liquid material 29 may react with each other, e.g. physically, chemically, or biologically, for instance by congealing together, reacting together, an enzymatic reaction, etc.

FIG. 1 schematically depicts an embodiment of the production process, wherein the in-flight formation process comprises a combined in-flight formation process, as will be further explained below, referring to FIG. 6.

Figure 2:
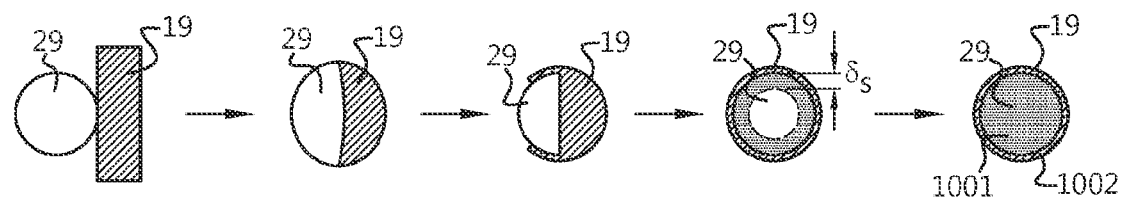
FIG. 2 schematically depicts aspect of the process.
Figure 3:
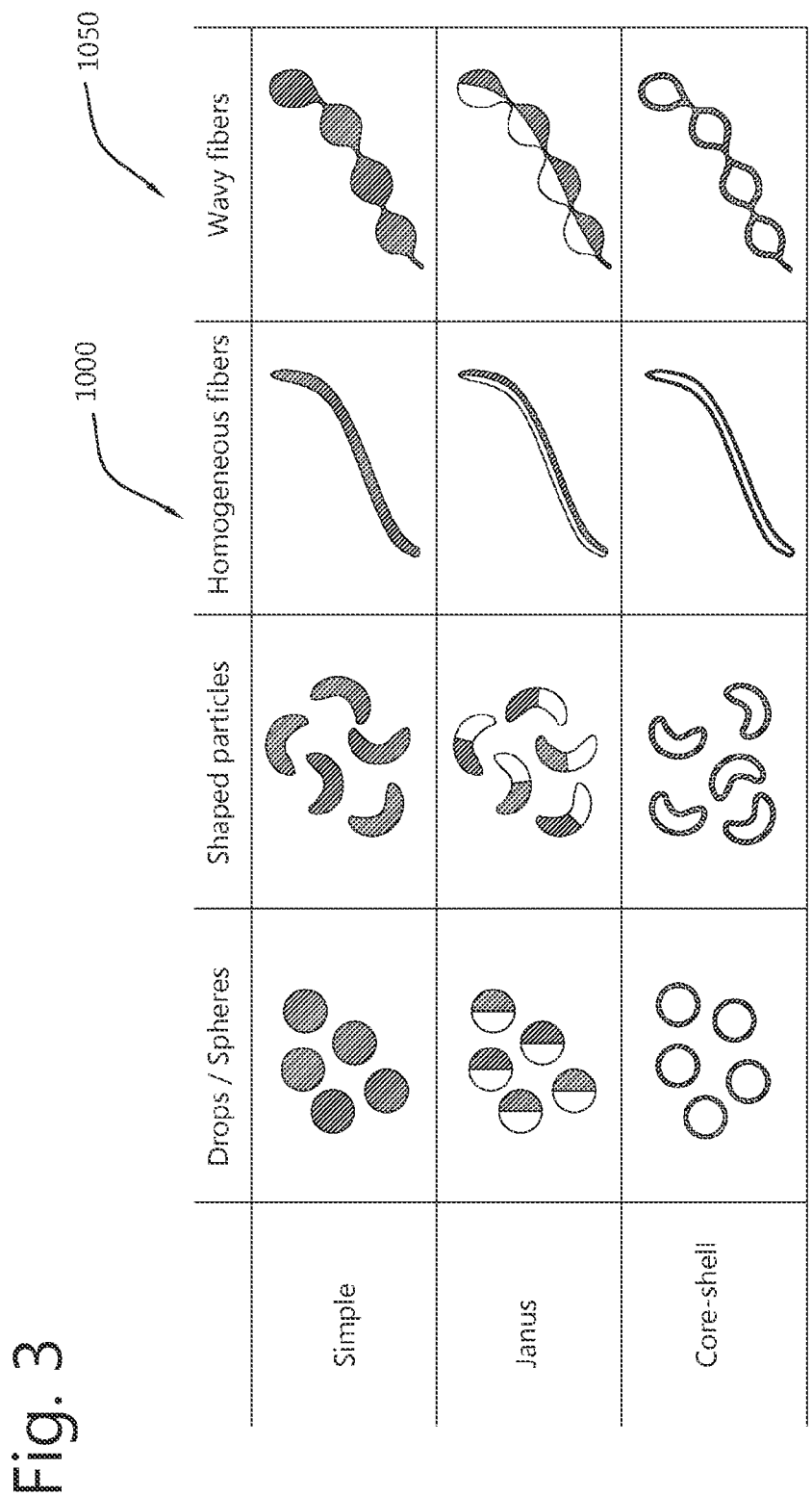
FIG. 3 schematically depicts some products that may be provided with the method and device.
Figure 4A:
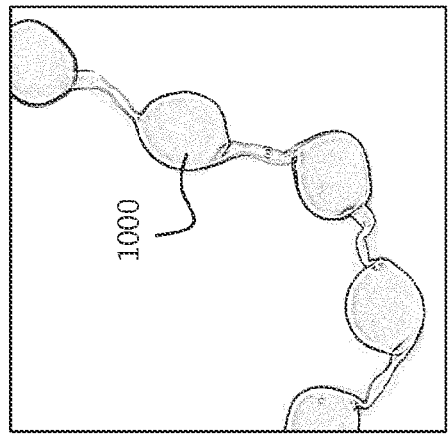
Figure 4B:
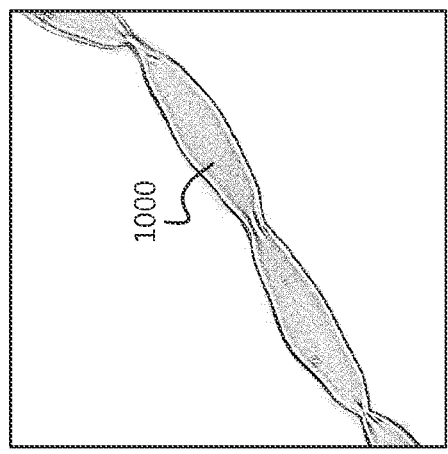
Figure 4C:
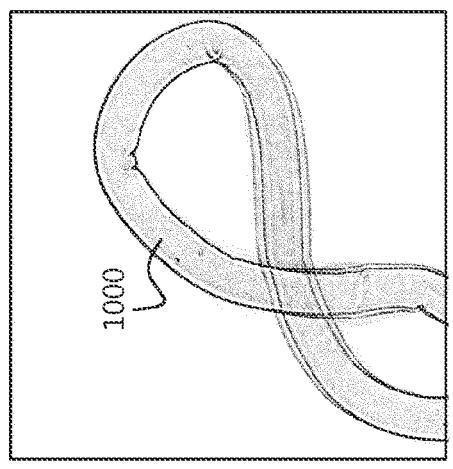

Especially the process comprises an impact between a first liquid material 19 and a second liquid material 29 having a difference in surface tension. Especially, the ratio of the different surface tensions is at least 1.005 and not more than 7. At the collision point 80, the first liquid material 19 and second liquid material 29 may coalesce because of this difference in surface tension, wherein the liquid material with the lowest surface tension may encapsulate the liquid material other material, see FIG. 2, schematically showing from the left to the right a scheme of impact, encapsulation, and solidification mechanisms. Here, the first liquid material 19 encapsulates the second liquid material 29. After (partly) solidification a round shaped product 1000, especially a particle 1000, may be provided comprising a core 1001 and a shell 1002. Solidification may be a time controlled process as is shown by a partly solidified core initially having a solidification thickness $\delta s$, whereas finally the complete core is solidified. Alternatively or additionally, in other embodiments, the shell may solidify. As is explained above the degree of solidification may for example be controlled by adjusting the distance between the contact point 180 and the receptor element 90, In FIGS. 3 and 4 some examples of possible products of the process are depicted. In FIG. 3 various products 1000 with added complexity (top to bottom) are depicted. These products 1000, also referred to as "base units" 1050 may commonly be produced using different embodiments of the process. At the top simple, single-phase units are shown. In the center "Janus" units, referring to a 2-sided fiber or particle are shown. Janus fibers may have more than two materials which are "stacked" so that they all have a face at the surface. At the bottom "core-shell" units are depicted that may be present in four possible phase configurations: (a) double emulsions that comprise a liquid core and a liquid shell; (b) core-shell particles that comprise a liquid core with a solid shell; (c) core-shell particles that comprise a solid core and a solid shell, and (d) comprising a solid core with a liquid shell. Especially one or more of the first liquid material 19 and second liquid material 29 may comprise a solidifier, such as a cross-linker for the other liquid material 19, 29 to provide these possible phase configurations. Additionally or alternatively, one or more of the first liquid material 19 and the second liquid material 29 are solidifiable. In embodiments products 1000 are received in a liquid phase which is a solvent for the shell and/or the core, especially allowing to produce shell-less products (comprising only a core) or porous particles (comprising only a shell). Especially the shapes of the products 1000 may be controlled by among others the location of the collision point(s) 80, 85 (providing e.g. the jet-jet, drop-jet or drop-drop mode), the velocity of the different jets at the collision point(s) 80, 85, and the liquid material 10, 20, 30, . . . properties. In FIGS. 4a-4c, the effect of the ratio L/LB is shown, wherein one of the two different liquid jets 10, 20 is modulated. The three products at the top (FIGS. 4A, 4B, and 4C) are provided with increasing L/LB. From the left to the right for respectively L<<LB, L/LB<0.9, and L~LB (wherein L being just smaller than LB). FIG. 4c shows a pearl-lace shaped product 1000. A further increase of L/LB will result in a drop-jet mode, providing e.g. products shown at the bottom in FIGS. 4d and 4e. These two pictures at the bottom show the effect of difference in liquid velocity of the first liquid jet 10 and the second liquid jet 20, wherein the process comprises the drop-jet mode. Especially increasing the difference in velocity may provide elongated droplets at the collision point 80, providing elongated products 1000 (compare FIG. 4e to FIG. 4d).

In FIG. 5 a picture of a 3D body 1100 is given produced by device described herein (see also experimental section). The 3D body 1100 is provided by an embodiment of the production process comprising receiving the product 1000 of the in-flight formation process in a mold. Especially, a rapidly solidifying core and a liquid shell enables injection of (partly) solid structures. At the left hand side (FIG. 5a) the body 1100 is shown after release from the mold. In the middle (FIG. 5b) the zoomed image shows that the cell-containing fibers 1200 are mostly collected far from the edge of the body 1200. The detail image at the right (FIG. 5c) shows that an outer matrix 1150 contains the fibers 1200, which in turn contain cells 1250.

Figure 6A:
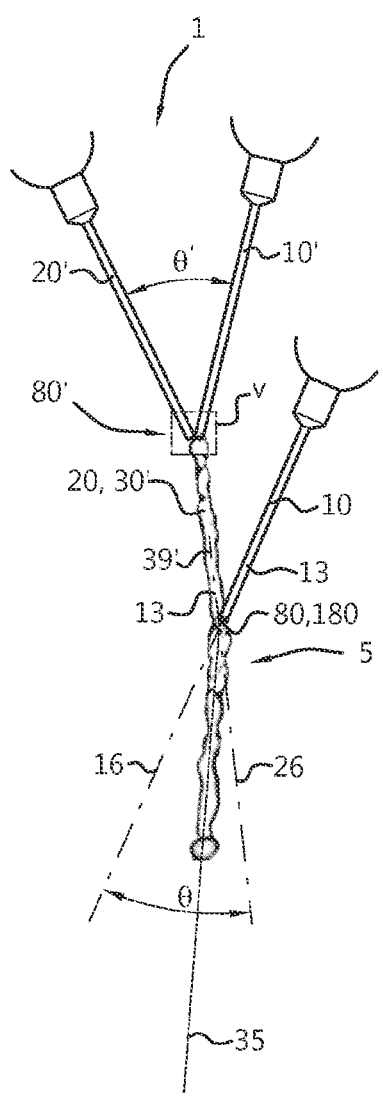
Figure 6B:
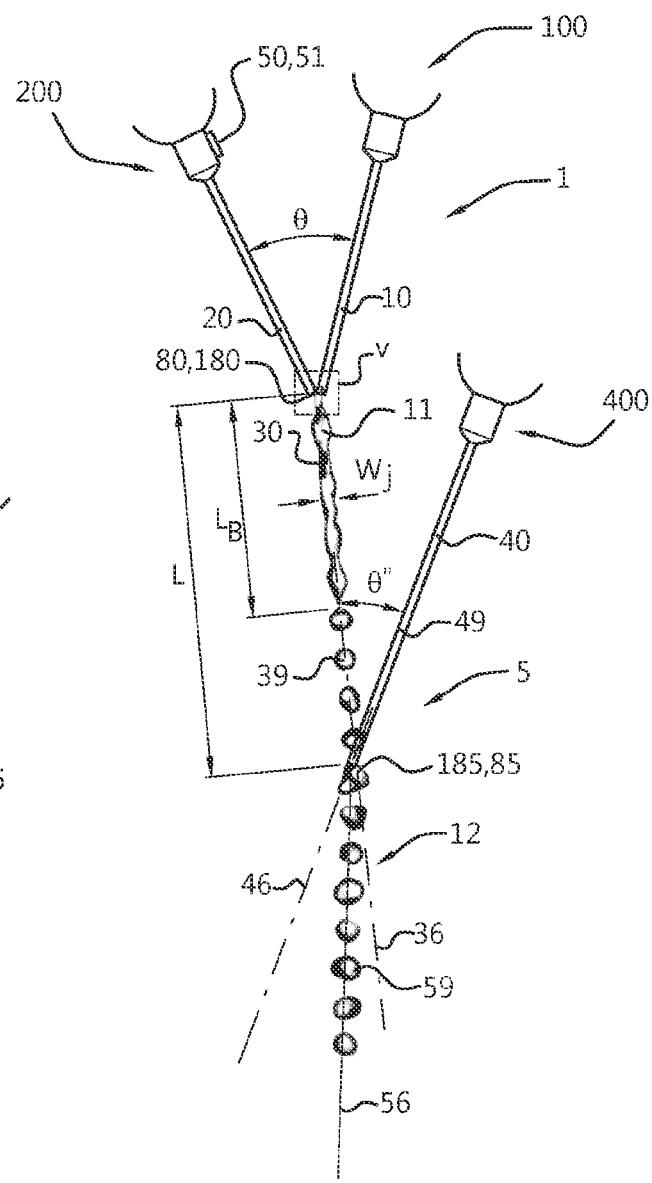

In FIG. 6 some embodiments comprising the in-flight formation process in series is schematically depicted. In other embodiments at least one in-flight formation process and at least one indirect contacting formation process may be arranged in series. In FIG. 6b an embodiment related to a combined (in-flight) formation process is depicted. In FIG. 6a a production process, wherein one or more of the first liquid jet 10 and the second liquid jet 20 are the product of another formation process, here an in-flight formation process, is depicted. In further advantageous embodiments these embodiments may be combined. In yet further embodiments one or more of the first liquid jet 10 and the second liquid jet 20 is the product of an indirect contacting formation process. In the embodiment of FIG. 6a, the first liquid jet 10 collides with a second liquid jet 20. This second liquid jet 20 comprises essentially a (coalesced) third material 39', provided by another first liquid jet 10' and another second liquid jet 20', of another (preceding) in-flight formation process. In embodiments the angle Θ between the first jet direction 16 and the second jet direction 26 may be controlled. Also the angel Θ' between the direction of the other first liquid jet 10' and the other second liquid jet 20' may be controlled. The angles Θ, Θ' may differ from each other. Especially the embodiment shows both in-flight formation processes in jet-jet mode. In other embodiments other modes may be used.

The embodiment related to a combined formation process, FIG. 6b depicts a combined in-flight formation process, comprising a fourth (device) liquid jet 40 directed with a fourth jet direction 46 to a second contact point 185 comprising a second collision point 85 in said gas atmosphere 5 with the third material 39, wherein the fourth liquid jet 40 comprises a fourth liquid material 49. After collision of the third material 39 and the fourth liquid jet 40 at the second collision point 85, the third material 39 and the fourth liquid material 49 may combine, especially coalesce to provide a (coalesced) fifth material 59 at the second collision point 85 propagating in a fifth direction 56, wherein the third direction 36 of the third jet 30 and the fourth jet direction 46 have a mutual angle Θ" larger than 0° and especially equal to or smaller than 45°. In the figure also schematically a length of the third jet 30 and a breaking length LB of the third liquid jet 30 is depicted. Especially, the third jet 30 may also be characterized as a modulated jet 11, showing a variable width Wj in a direction perpendicular to the jet direction 36. In other embodiments (also comprising an indirect contacting formation process), the third material 39 may be directed to a face of another liquid device providing the fourth liquid jet 49 through an opening of said other liquid device, and contact that jet 49 at the second contact point 185 to provide the fifth material 59 at that second contact point 185. Especially wherein said second contact point is configured at the opening of said other liquid device, or downstream (with respect to jet 49) thereof. In the embodiment depicted in FIG. 6b the first liquid providing device 100 providing the first liquid jet 10 and or the second liquid providing device 200 providing the second liquid jet 20 may comprise a (modulating) actuator 50. In the depicted embodiment, e.g., the second liquid providing device 200 comprises an element 51 configured to vibrate. It is noted that also in such embodiment the second liquid jet 20 does not have to be interrupted jet at the (first) collision point 80, and still may comprise an uninterrupted, jet. Moreover, especially the second liquid jet 20 may comprise a modulated liquid jet, provided by the (modulating) actuator 50/vibrating element 51 at the second liquid providing device 200, at the collision point 80, and especially the third liquid jet 30 may break-up because of the actuation of the second liquid jet 20. Hence actuating the one of the colliding liquids jets, such as the first liquid jet 10 and/or the second liquid jet 20, may provide a breakup of formed (coalesced) liquid jet, especially the third liquid jet 30.

In yet further embodiments the first contact point 180 and the second contact point 185 coincide, especially the first collision point 80 and the second collision point 85 may coincide. Such embodiments may e.g. provide the third material 39 comprising parallel fibers. Parallel fibers may in embodiments be twisted. Especially, embodiments of the invention also comprise twining.

In further embodiments, the production process comprises twining at least one of the materials 19,29,39,49 (especially, the first liquid material 19, the second liquid material 29, the third material 39, and the forth material 49) around at least another one of the materials 19,29,39,49.

Figure 7:
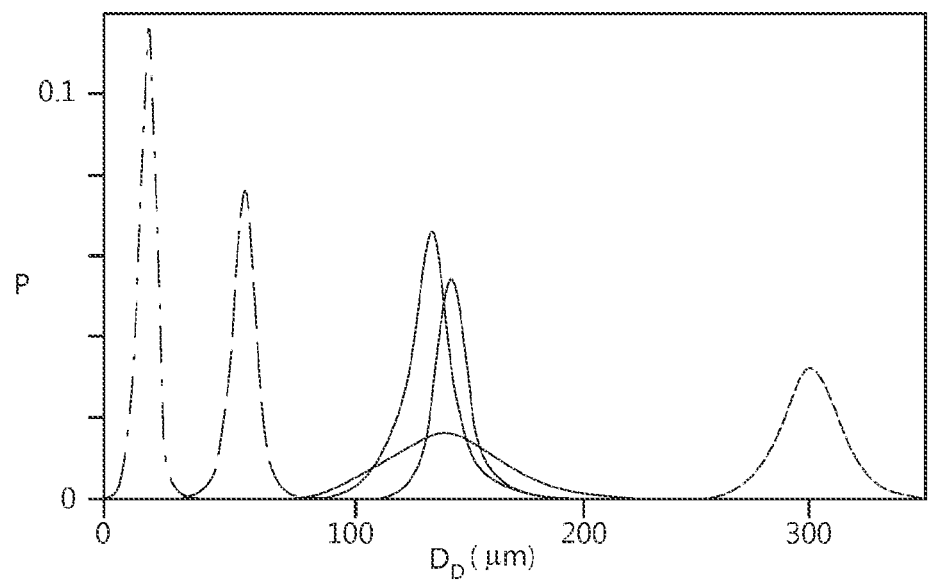

In FIG. 7 the result of an experiment are depicted showing size distributions curves, wherein the fraction P at the y-axis as a function of the size (diameter) at the x-axis of droplets in droplet comprising third material 39 provided by a drop-jet mode as a function of the size of the opening 101, 201 of the liquid providing devices 100, 200. Also the effect of the modulation of the drop train providing jet is depicted. In the experiment, the size of the openings 101, 102 is set at 20, 50, 100, and 250 nm, resulting in the distribution curves shown with different line styles respectively from the left to the right hand side (broken with dots, broken, intact, and dotted curves). At the opening of 100 nm the modulation is also changed, by changing the frequency of actuation. Increasing frequency resulted in a more homogeneous size distribution, and a decrease in droplet size, as is illustrated by the shift in the intact curves towards a smaller droplet size and a smaller distribution.

Figure 9:
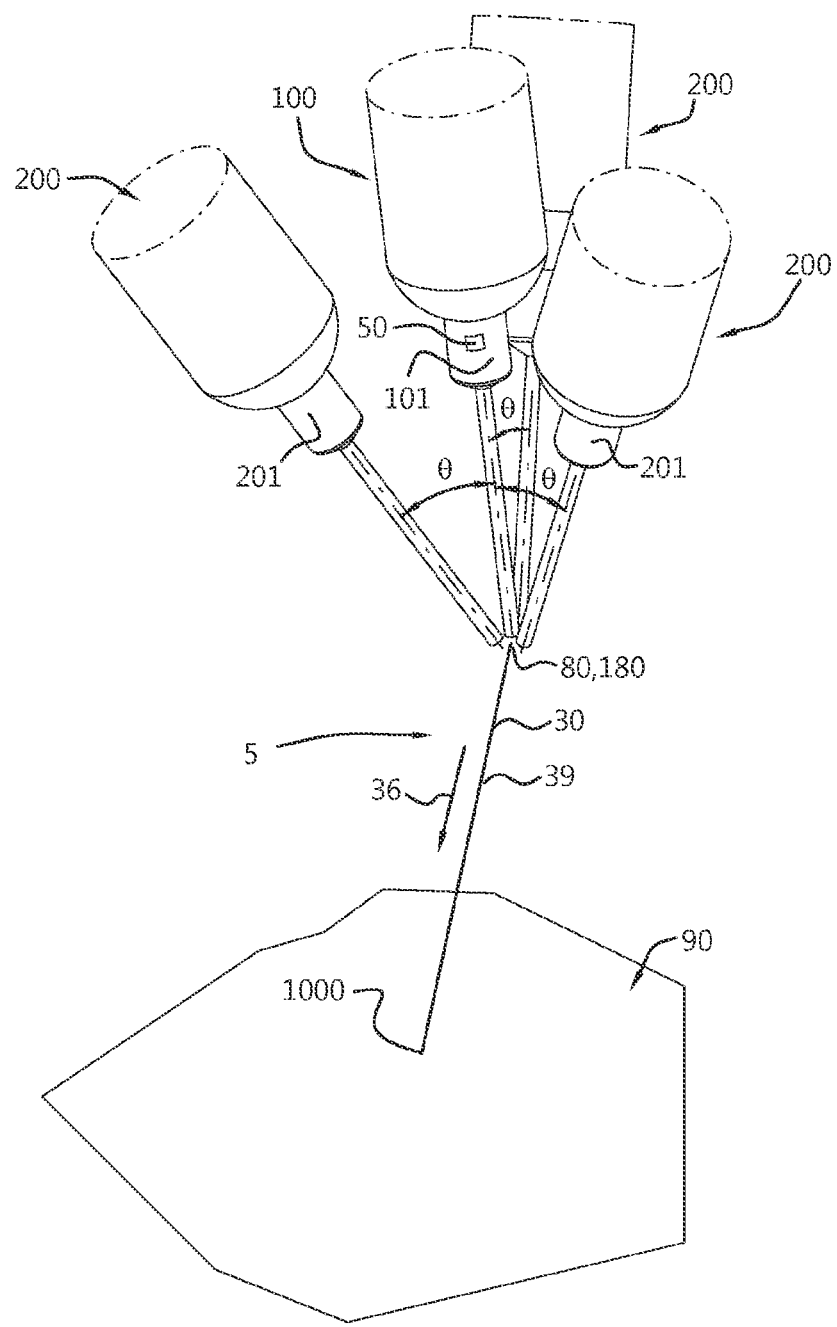

In FIG. 8, an embodiment of the device 1 (and the formation process, especially the indirect contacting formation process) is schematically depicted, showing a first device liquid jet 10 (provided by the first liquid providing device 100) providing a first device liquid material 111, especially a first device liquid 19, to the second device face 205 at a position above the second device opening 201. The first device liquid 110 wets the second device face 205 and may temporarily accumulate at the second device face 205, depending e.g. on the material properties of the second device face 205 in relation to the properties of the first liquid material 19. The surface of the face 205, may e.g. comprise hydrophilic properties. In other embodiments, the second device surface 205 may comprise hydrophobic properties. The second device opening 201 provides a second device liquid jet (not shown since the length of the jet is substantially zero) comprising second liquid material 29 that, when contacting the first liquid material 19 at the contact point 180 may drag along the first liquid material 19 to provide the third jet 30 comprising the coalesced third material 39. Especially the contact point 180 is configured at the second device opening 201. In further embodiments (not depicted) the first liquid device opening 101 is configured in physical contact with the second device face 205. The figure, especially schematically depicts a jet-nozzle mode, wherein a first jet 10 impacts a nozzle, especially a second device face 205. In further embodiments opening 101 of the first nozzle may physically contact the second device face 205. Especially the later embodiments relate to a nozzle-nozzle mode FIG. 9 schematically depicts an embodiment comprising a plurality of second liquid jets directed 20 to the mutual collision point 80 comprising the contact point 180. In the depicted embodiment the angle Θ defined by the first device opening 100 and the respective second device opening 201 is alike. In other embodiments, these angles Θ may differ from each other. Especially having additional second liquid jets 20 may ease scaling up of the process. It may also allow to control the third direction 36 of the third jet 30, e.g. allowing to direct the location to deposit the third material 39 at a receptor element 90, especially to configure the product 1000 of the formation process The direction may e.g. be controlled by changing the angles Θ of the respective second devices 200. The direction may also be controlled by changing the flow of the respective second liquid jets 20. Especially, such embodiments may also provide fibers. Especially by rotating e.g. one or more of the receptor element 90 and the liquid providing device 100, 200, the fibers may be rotated and/or twisted, wherein the process especially comprises twining. Also, in embodiments comprising more than two colliding jets, one or more of the jets may be modulated, especially one or more of the liquid providing devices 100, 200 may comprise a modulating actuator 50.

EXPERIMENTAL

Experiments are described wherein a first liquid jet and a second liquid jet collide at a (first) collision point.

Device Preparation and Operation:

Liquid jets were ejected from nozzle tips of specified diameters. The nozzle tip consisted of 4±1 mm long fused silica tubing (Idex Health&Science, Bristol, CT, USA) with an outer diameter of 360 μm and inner diameters of 20 μm, 50 μm, 100 μm, 150 μm, or 250 μm. These tips were cut using a Shortix capillary cutter (SGT, Singapore), and glued into PEEK tubing (Idex H&S) with an inner diameter of 0.5 mm and an outer diameter of 1/16", using a quick set epoxy adhesive (RS 850-956, RS components Ltd., Corby, UK). The PEEK tubing was stuck and clamped to the (modulating) actuator using two-sided tape (3M) and standard optical components (Thorlabs, Newton, NJ, USA), respectively. For actuation, a piezo-electric element was used, to which a sine wave of high voltage (150V) was applied. For various nozzle sizes and flow rates, jet breakup into droplets was monitored using a stroboscopic visualization setup. This approach enabled to fine-tune the actuation frequency for stable jet break-up. Unless otherwise specified, flow velocities of 1.3±0.2× the minimum flow velocity (below which dripping occurs instead of jetting) were applied. It is noted that, at the minimum flow velocity a liquid Weber number $We_l$ may equal 1. The liquid Weber number, $We_l$ being defined as $\rho_l V^2 D/\sigma_l$, with $\rho_l$, V, $\sigma_l$ being the density, velocity and surface tension of the liquid respectively, and D being the diameter of the jet or of a droplet in the jet.

These velocities were found to yield the most stable jet break-up while still allowing for well-controlled in-air processing. Both nozzles (as required for the two jets or droplet trains) were of equal diameter, and operated at equal velocity unless otherwise specified. The respective position of the nozzles was controlled by mounting one of the nozzles onto a 3D stage with 1 μm-precision (Thorlabs). In the hand-held device, a screw was used to deflect the nozzle tip. Rotating this screw (diameter M4) allowed for precise aiming of the two liquid jets, enabling their in-air coalescence. To control the flow rate, a standard syringe pump (type PhD 2000, Harvard Apparatus, Holliston, MA, USA) and plastic syringes were used (5 ml or 10 ml, Luer-Lok, BD, Franklin Lakes, NJ, USA). A high-power syringe pump (Harvard Apparatus) and steel syringes (9 ml, Harvard Apparatus) were used in case excessive pressure drops over the nozzle tip caused the standard syringe pump to stall (i.e. mainly for the 20 μm nozzles). Threaded adapters (Idex H&S) were used to connect the syringes to the PEEK tubing in which the nozzle tips were glued as described.

Reagents

The following liquids were used to generate various materials:

Default Configuration, Used Unless Otherwise Specified.

Liquid 1 (droplet train/jet): 0.5% (w/v) sodium alginate (80 to 120 cP, Wako Chemicals) solution. Liquid 2 (jet): A 0.1M $CaCl_2$ in a 10% (vol.) Ethanol solution. Liquid 3 (bath): A 0.03M $CaCl_2$ solution.

Water-Oil Emulsions:

Liquid 1: Water. Liquid 2: Surfactant containing perfluorocarbon oil (2% Pico-Surf 1 in Novec 7500, Dolomite, Royston, UK) PicoSurf. Liquid 3: PerFluor Perfluorocarbon oil+one drop Pico-Surf 1. Liquid 3: PerFluor+drop of pico-surf.

Double Emulsions (Water-Oil-Water):

Liquid 1: Water. Liquid 2: PicoSurf. Liquid 3: Water+1% Sodium dodecyl sulfate (SDS).

Liquid-Filled Core-Shell Particles and Liquid-Filled Foams:

Liquid 1: A 0.2M $CaCl_2$+5% PEG400 solution. Liquid 2: A 0.4% sodium alginate (5 to 40 cP, Sigma-Aldrich)+20% Ethanol. Liquid 3: A 0.03M $CaCl_2$ solution.

Solid-Filled Core-Shell Particles and Hierarchical SFF:

Liquid 1: A 0.2M $CaCl_2$+5% PEG400 solution. To be completed Liquid 2: A 0.4% sodium alginate (5 to 40 cP, Sigma-Aldrich)+20% Ethanol. Liquid 3: A 0.03M $CaCl_2$ solution.

Hierarchical Injectable:

Liquid 1: A 0.2M $CaCl_2$+5% PEG400 solution. Liquid 2: A 0.4% sodium alginate (5 to 40 cP, Sigma-Aldrich)+20% Ethanol. Liquid 3: A 0.03M $CaCl_2$ solution.

For visualization purposes, <0.1% of dextran-FITC (2000 kDa, Sigma-Aldrich, St. Louis, MO, USA), Rhodamine B dye, or rhodamine B-stained particles (500 nm diameter) were added to the liquid to be visualized.

Cell Isolation, Expansion and Encapsulation:

Human mesenchymal stem cells (MSCs) were isolated from fresh bone marrow samples and cultured. The use of patient material was approved by the local ethical committee of the Medisch Spectrum Twente and informed written consent was obtained for all samples. In short, nucleated cells in the bone marrow aspirates were counted, seeded in tissue culture flasks at a density of $5*10^5$ cells/$cm^2$ and cultured in MSC proliferation medium, consisting of 10% (v/v) fetal bovine serum (FBS, Lonza), 100 U/ml Penicillin with 100 mg/ml Streptomycin (Gibco), 2 mM L-Glutamine (Gibco), 0.2 mM ascorbic acid and 1 ng/ml basic fibroblast growth factor (ISOKine bFGF, Neuromics) in Minimal Essential Medium (MEM) α with nucleosides (Gibco). MSCs were cultured under 5% $CO_2$ at 37° C. and medium was replaced 2 to 3 times per week. When cell culture reached near confluence, the cells were detached using 0.25% Trypsin-EDTA (Gibco) at 37° C. and subsequently subcultured or used for experimentation. For cell encapsulation, MSCs were suspended in MSC proliferation medium and mixed with 1% (w/v) sodium alginate (80 to 120 cP, Wako Chemicals) in phosphate-buffered saline (PBS, Gibco) in a 1:1 ratio. The cell-laden hydrogel precursor solution was loaded into a disposable syringe and connected to the IAMF setup for micro gel production. After encapsulation, cell-laden micro gels were cultured in 6-wells plates (Nunc) with MSC proliferation medium under 5% $CO_2$ at 37° C. Viability of encapsulated MSCs was analyzed using a live/dead assay (Molecular Probes) following manufacturers protocol and visualization using a fluorescence microscope (EVOS FL, Thermo Fisher Scientific). Images were analyzed using ImageJ software and cell viability was quantified via artisan counting.

Protocol for Washing/Collecting Micro Gels:

1) Add 1 ml PBS+$CaCl_2$ Eppendorf.
2) Collect ~500 μl micro gels+cross linker solution.
3) If necessary, wash 3× with tap water and 2× with PBS+$CaCl_2$ (e.g. to remove background fluorescence).

Washing procedure: Spin down micro gels using 3 short spins in micro centrifuge. Remove 1 ml supernatant. Add 1 ml fresh solution.

Surface Tension Measurement:

The surface tensions of various (Water+0.1M $CaCl_2$)—ethanol mixtures were measured by the hanging drop method, using a Dataphysics OCA15Pro optical contact angle measuring system. The ethanol volume fraction is defined as $f=V_1/(V_1+V_2)$, where $V_1$ and $V_2$ refer to the volumes of unmixed ethanol and water-$CaCl_2$, respectively. The results overlap previous measurements for ethanol-water mixtures within the experimental error (5%), indicating that the presence of $CaCl_2$ hardly affects the surface tension of the mixed liquid.

Results

Here, monodisperse droplets are generated by controlled breakup of the liquid jet ejected from nozzle 1. This droplet train impacts onto an intact liquid jet that is ejected from nozzle 2, resulting in a compound monodisperse droplet train flowing downwards. Subsequently, after typically ~100 ms in our experiments, the compound droplets are collected in a bath or deposited onto a solid surface. Alternatively, the setup can be operated in "jet-jet mode". This mode enables to spin fibers, by solidifying one of the liquids prior to breakup of the merged jet. Finally, we operated the system in "drop-drop mode", but found this mode more challenging than the drop-jet mode while not adding functionality, and therefore abandoned this direction. Still, the physical mechanisms governing drop-drop mode are relatively well-studied and also apply to the other modes, which we exploit in the following. First, the droplet impacts onto the jet. Since a significant ejection velocity is required for jet formation, a small impact angle $\Theta=25°\pm5°$ was chosen to ensure a low impact Weber number. Experiments where the droplet is selectively colored, confirmed that the droplets maintain their spherical shape during impact. For $We_{impact}\sim1$ (the horizontal vector of the Weber number), the coalescence is capillary driven and the impact occurs on a capillary time scale $\tau_{cap}=(\rho D_1^3 \sigma_1/\mu_1)^{1/2}$. in which $D_1$, $\sigma_1$, and $\mu_1$ are the diameter of the droplets, and the surface tension and the viscosity of the liquid in the droplets (in the droplet train) respectively. The advantageous method that may prevent the droplets from merging during flight is to provide their encapsulation by the jet. Subsequently, encapsulation of the droplets by the jet was achieved by lowering the surface tension of the encapsulating (jet) liquid by adding a small amount of ethanol. As a result, Marangoni flow (i.e. driven by surface tension gradients) pulls a thin film of the low surface-tension liquid (of the jet) around the high surface-tension liquid (of the droplet), as depicted in FIG. 2. Our state-of-the-art visualization techniques revealed the encapsulation process. The process occurs on a numerically validated time scale $\tau_e \sim \sigma_1 Oh_1 \tau_{cap}/\Delta\sigma$, with $\Delta\sigma=\sigma_1-\sigma_2$ and $\sigma_2$ the surface tension of the liquid jet, and wherein $Oh_1=\mu_1/(\rho_1\sigma_1 D_1)^{1/2}$ is the Ohnesorge number in which $\mu_1$ is the droplet's viscosity. For our experimental conditions, $\tau_e$ is comparable to the impact time scale $\phi_{cap}$. Therefore, both impact and encapsulation are completed in the air, prior to collection or deposition which may typically happen at a timescale of about 1 ms-100 ms after in-air impact.

Finally, solidification of the droplets enabled the production of particles. In particular, the inner and outer liquids could be chosen such that one or both of them solidified. Here we used alginate-containing droplets and $CaCl_2$ jets a model system to freeze the droplets in-air, since alginate solidifies when merged with $CaCl_2$.

By introducing a surface tension gradient $\Delta\sigma$, the particle shape could be tuned from irregular ($\Delta\sigma=0$ mN/m) to spherical ($\Delta\sigma>5$ mN/m). The regime transition from irregular to regular, especially spherical particles was observed at a $\Delta\sigma=5$ mN/m, as achieved by adding a minimal amount of 0.3% ethanol. In alternative embodiments, e.g. comprising alternative droplet sizes and/or liquids this threshold may be varied between 0.2 mN/m to 1000 mN/m.

It is surprising that the particle shape may be controlled by combining surface-tension-driven encapsulation and solidification, as even a thin solid front could potentially inhibit the Marangoni flow. To provide a first rationalization of this observation, we hypothesize that encapsulation is achieved if the surface tension gradient exceeds the strength of the solidifying film. The thickness of this film is estimated as $\delta_s \sim (D_s \tau_s)^{1/2}$, with $D_s \sim 10^{-9}$ m$^2$s$^{-1}$ the effective diffusion constant of the solidification front. The strength of the film is estimated as $\sigma_f \delta_s$, where $\sigma_f=10^4$ Pa is the fracture stress of a 0.5% alginate gel. By equating $\sigma_f \delta_s$, and solving for $\Delta\sigma$, one may determine a transition $\Delta\sigma$ as a function of nozzle diameter at which the obtained shape changes from irregular shape to regular shape. For the measured parameter regime, the expected film strength lies between 2 mN/m and 5 mN/m, which is remarkably close to the experimental threshold $\Delta\sigma=5$ mN/m. However, the predicted dependence on the diameter of the nozzle is not observed, possibly because the initial solidification dynamics (e.g. temporally increasing viscosities while crosslinking) are ignored. Future studies may reveal the details of combined Marangoni flow and solidification, which would be applicable to other encapsulation methods as well.

Remarkably, for mass-driven solidification as used in our system, $\tau_s \ll \tau_{cap}$ even for extremely thin solid films of thickness $\delta/D_1=10^{-2}$. Therefore, solidification was unlikely to interfere with the impact and encapsulation, but indeed followed these events immediately and in-flight.

Visualization of the collected alginate micro-particles reveals that alginate and $CaCl_2$ solutions with equal surface tensions results in the formation of irregular, bag-shaped alginate particles. However, a dramatic change occurs for droplet encapsulation by a low surface-tension jet, which results in spherical particles. We then determined the minimal difference in surface tension for in-air encapsulation, by analyzing the shape (bag vs. spherical) of alginate micro gels with different diameters as a function of the $CaCl_2$ jet surface tension. It was demonstrated that, monodisperse spherical micro gels with diameters ranging from 20 μm to 250 μm are produced for $\sigma_1/\sigma_2>1.2$, which corresponded to adding only 1% of ethanol to the jet. This implies that relatively weak, but fully cytocompatible alternative surface tension modifiers such as polyethylene glycol could also aid in-air droplet encapsulation. This safe, versatile and robust approach aids the rapid integration of IAMF in clinical applications.

A limitation of IAMF may be the relatively short in-air time of ~100 ms. Therefore, only rapidly solidifying hydrogels such as alginate seem to be suitable for IAMF. To overcome this limitation and thus enable the use of a wide variety of in-situ cross-linkable hydrogels, we used alginate as a template. As a proof-of-concept, we solidified droplets that consist of an alginate/dextran-tyramine mixture in-air, by impact on a $CaCl_2$-containing jet (as described). These particles were collected in a bath containing the crosslinking agent for dextran-tyramine, to form an interpenetrating network of alginate and dextran-tyramine Subsequently, we dissolved the alginate from the particles using a calcium chelator, leaving only dextran-tyramine micro-gels behind. This templating approach enables oil-free production of complex-shaped micro particles of arbitrary hydrogels. Alternatively, rapid temperature or light-induced freezing mechanisms can be exploited to solidify materials in-air.

With a single device droplets, particles, and fibers in various shapes, were prepared. Microfluidic base units were produced in the drop-jet mode; examples are given in FIGS. 3, 4 and in the table given further below. Coalescing water droplets onto a surfactant containing fluorocarbon oil jet—with lower surface tension—readily enabled the production of monodisperse water-in-oil (w/o) emulsions. Moreover, collecting these w/o droplet in sodium dodecyl sulfate (SDS) containing water resulted in w/o/w double emulsions. However, making the inverse oil-water suspension proved challenging and remains to be realized, since oils generally have a low surface tension. Still, a single IAMF setup produced both single and double emulsions without the need of a hydrophobic or hydrophilic surface treatment, a typical constraint of chip-based microfluidics. Furthermore, IAMF also enables direct oil-free production of particles, a proven strategy for the encapsulation of food, drugs and even cells. Here, monodisperse micro particles were produced by in-air gelation of alginate droplets by a $CaCl_2$ and ethanol containing jet. Alternatively, by coalescing $CaCl_2$ droplets onto an ethanol containing alginate jet, alginate capsules were produced. The latter approach was further explored for the production of multi-material core-shell particles. Specifically, we incorporated enzymatically crosslinkable dextran-tyramine conjugates and horseradish peroxidase into the $CaCl_2$ containing droplets, while mixing its corresponding cross linker hydrogen peroxide in the alginate containing jet. This approach enables production of multi-material core-shell micro gels. However, the capsules and the multi-material core-shell micro particles frequently result in (un-desired) merged particles comprising multi-core particles. We hypothesize that the origin of these multi-core particles is in-air collision of partly-solidified shells, as observed in the live view of the droplet trains. Such inter-droplet collisions may be prevented by further homogenizing the speed and size of the droplets, for example by optimizing the pump and nozzle design. The robustness of IAMF with respect to the droplet or particle size was investigated, since size is a key control parameter for virtually any application. Using different nozzles, monodisperse alginate micro gels with diameters ranging from 20 μm to 300 μm were readily produced. The size distributions are plotted in FIG. 7, indicating reasonable monodispersity for each nozzle size. Furthermore, for a single nozzle diameter, the exact micro gel diameter can be fine-tuned by altering the actuation frequency f, as shown in FIG. 7 for the nozzle diameter of 100 μm (for clarity reasons, only a few curves are plotted). Such an approach may be highly relevant if large nozzles are required but small droplets are desired, for example to prevent clogging when dispensing cell-containing liquids. Finally, the typical drop size in IAMF can be reduced much further by using smaller nozzles of e.g. 1 μm. Therefore, IAMF may be rapidly adopted as a microencapsulation technique for food and pharmacy, where these small drops are widely used.

Figure 4D:
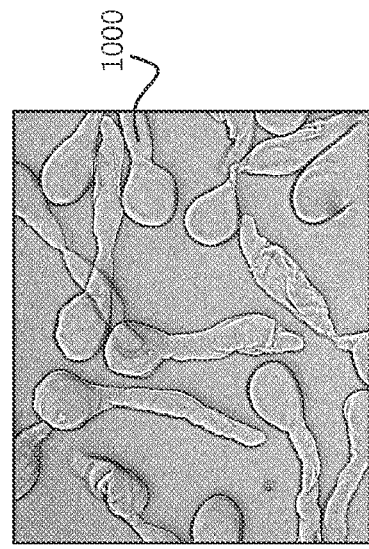
Figure 4E:
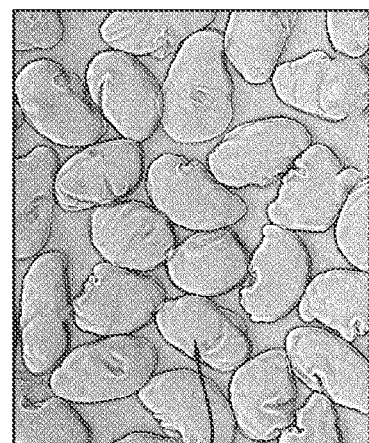

Shape-controlled fibers and particles are readily produced with the same setup. Fibers of homogeneous thickness were produced by coalescing alginate and $CaCl_2$ containing jets before they broke up, thus without actuation. Interestingly, with nozzle actuation turned on while moving the jets' impact location closer to the break-up point (i.e. $L \to L_B$), "wavy" fibers with periodic thickness are produced as shown in FIG. 4B. If the jet is solidified even closer to the break-up location $L_B$, the fiber resembles a lace of pearls, as shown in FIG. 4C. Finally, if $L > L_B$, the system is again operated in drop-jet mode resulting in substantially round particles. Still, in drop-jet mode, shape control of the particles was achieved by increasing the jet velocity while maintaining constant droplet velocity. In particular, particles with a rivulet shape were fabricated for $\alpha = V_1/V_2 > 1$, as shown in FIGS. 4d and 4e.

Emulsions, suspensions, and fibers comparable to the presently obtained results may also be produced by MF devices and, for particles, by shooting droplets through a liquid sheet. However, our approach has four distinct benefits for their production. First, production rates of droplets and particles are 100× faster as compared to MF chips (see also below). Second, a single, cost-effective, and hand-held device can be applied for producing all these units. Third, producing particles is achieved oil-free, which offers distinct advantages for clinical and biological applications over MF approaches in which oil is required as a lubricant. Fourth, IAMF can be readily integrated in equipment where a droplet train is used, such as flow-assisted cell sorters. For these reasons, we believe that IAMF may finally bring microfluidic functions to a wide range of applications.

One-Step Printing of 3D Hierarchical Materials

Another novelty of IAMF is one-step deposition of materials with a structural hierarchy, which can be realized in various architectures. The most straightforward implementation is a soft "micro-spaghetti". Here, fibers were deposited into a mold instead of a bath, wherein the mold was moved during depositing. Similarly, operating the IAMF system in drop-jet mode enables rapid production of droplets or particles that constitute dense suspensions or emulsions if they are deposited on a solid material. Since these materials can already be produced using chip-based microfluidics, here the high throughput of IAMF is expected to be a key benefit.

Second, injectable shape-stable solids with a structural hierarchy are formed by combining a rapidly gelating inner phase, called "core", and a slowly solidifying outer phase, the "shell". Here, after impact, particles or fibers are lubricated by their still-liquid shell, which solidifies only after a stationary situation is reached. These injectable solids have a well-controlled microstructure and can be readily employed to fill a cavity. Such an approach is highly relevant for e.g. cartilage repairs. Alternatively, constructs with a wide range of shapes and surface finishes can be produced by loosening these constructs from a pre-defined mold, as demonstrated in FIG. 5 thus enables the production of solid hierarchical constructs in virtually arbitrary shapes, similar to existing casting techniques.

Third, by introducing a rapidly solidifying shell and using a non-solidifying core, porous, liquid-filled structures are deposited in one step. Microfluidic approaches to make such monodisperse foams enable even more control of the pore location, but require to first form and subsequently solidify a porous structure, which is a highly non-trivial and relatively slow process. In contrast, IAMF allows high-throughput deposition of each pore in a predefined shape. Therefore, IAMF may aid studying the elasticity and failure of these closed cell, fluid-filled, solid foams, which have a geometry similar to fruits and vegetables.

Finally and most importantly, one-step printing of hierarchical, free-standing solid structures is achieved by combining a rapidly solidifying shell and a slowly solidifying core. Here, each shell already partially solidifies in-air and therefore maintains its shape upon impact, to constitute a 3D construct. Using this technique we were able to build a hollow construct. In this example, impact onto a rotating glass slide resulted in a hollow hydrogel cylinder resembling a blood vessel. But a wide variety of 3D shapes would be available by integrating the IAMF nozzles in a 3D printer.

Potential Applications of IAMF

The versatility, resolution, throughput, and ease of use of IAMF are now discussed, since these parameters are crucial for applications. First, the versatility can be enhanced even further: By varying the core and shell materials alone, 16 different material topologies can be deposited as summarized in the following table. Especially, most topologies/base units may be produced as particles and as fiber. In the table wet impact relates to receiving the base units in a liquid; whereas dry impact relates to deposition on a surface or other (dry) receptor element.

| Material type | | Shell | | Core | |
|---|---|---|---|---|---|
| Wet impact | Dry impact | Pre-cursor | Cross-linker | Pre-cursor | Cross-linker |
| (Double) emulsion[1] | Dense emulsion[1] | O | O | O | O |

| Material type | | Shell | | Core | |
| --- | --- | --- | --- | --- | --- |
| Wet impact | Dry impact | Pre-cursor | Cross-linker | Pre-cursor | Cross-linker |
| Particles/fibers[1,2] | Porous injectable[1,2] | O | IF | IF | O |
| Not stable | Multi-solid injectable[1,2] | PI | IF | IF | PI |
| Liquid core-solid shell[1,(2)] | Liquid-filled foam[1,(2)] | IF | O | O | IF |
| Solid core-solid shell[1,(2)] | Hierarchical SFF | IF | PI | PI | IF |

Overview of IAMF material products (left columns) as a function of shell and core gelation properties (right columns); wherein 0 meaning no solidification; IF meaning in-flight solidification, and PI post-impact solidification.
Superscripts: 1 = Deposition as droplets/particles; 2 = deposition as fibers; wherein use of brackets: no brackets = experimentally demonstrated, brackets = in principle possible.

Many more variations can be achieved by for example merging three or more different liquids in-air, introducing solid particles to the system or performing more advanced in-air chemistry including combustion. Next, droplets, particles or fibers can be dried in-air to yield a powder, potentially enhancing encapsulation and spray drying technologies as widely used in the food and pharmaceutical industries. Furthermore, thermal solidification may be exploited instead of gelation, which already enabled encapsulation by shooting aqueous droplets through a thin sheet of molten wax. Similarly, different driving mechanisms may be exploited for in-air impact and encapsulation. Using and combining these strategies may result in entirely different time scales for impact, encapsulation and solidification, and thus enable a tremendous variation of shapes, surface morphologies, and (printed) material properties. IAMF can be readily used to manufacture 16 different products, when in-flight coalescence and encapsulation are ensured. These products include emulsions, particle and fiber suspensions, and hierarchical materials comprising these particles and fibers. Multi-solid materials are typically produced by adding one solid precursor solution to the core-forming jet and its corresponding crosslinker to the shell-forming jet and a second distinct precursor and crosslinker vice versa.

The resolution and throughput of IAMF are compared to other drop-based and jet-based. A general trade-off between resolution and throughput is visible, in which in-air technologies such as inkjet printing and (electro) spraying generally score well. On the other hand, versatility is greatly enhanced by in-line control as used in microfluidics, but usually results in lower throughput. To our best knowledge, IAMF uniquely combines in-air processing with in-line control, which opens a new domain with a minimal traditional trade-off between resolution, throughput, and versatility.

The practical implementation of IAMF can be straightforward. A hand-held device allows for all functionality demonstrated here. Such a device is easy to clean, which benefits clinical translation as well as applications in food and pharmaceutics. Using such a device, structures can easily be printed onto surfaces with an arbitrary inclination angle.

For all these reasons, integration of IAMF in technologies that exploit droplet trains, such as continuous ink-jet printing or flow-assisted cell sorting, may add functionality without requiring major process changes. Users of droplet microfluidics may exploit the ~100 times throughput increase as offered by IAMF. However, we particularly expect advances in tissue engineering, where one-step deposition of multi-material and hierarchical nature-mimicking tissues is an urgent bottleneck. The material architectures demonstrated in above resemble natural plant and animal tissues, and are cytocompatible. Therefore, clinical translation of IAMF as well as applications in tissue regeneration and stem cell research are expected to be relatively straightforward.

In conclusion, we propose IAMF as a strategy to combine the benefits of device-based microfluidics with those of printing technologies. By merging reacting liquids in-air, materials that are very different from the liquids leaving the nozzles are deposited. This approach has two particular benefits. First, it circumvents a trade-off in material hardness that limits current printing techniques, and therefore allows deposition of a much wider range of materials. In particular, IAMF allows for one-step printing of multi-material topologies, as urgently demanded in bio fabrication. Second, the lack of a lubricating liquid as used in microfluidic devices enables ~100 times faster processing of droplets and particles (microfluidics already enables fast production of fibers). A wide variety of such "base units" was demonstrated, but we expect to develop more varieties in the future. Finally, IAMF allows for optical access of in-air chemical processes, can be readily integrated into existing nozzle-based equipment, and is cost-effective and straightforward to implement. Therefore, we foresee a major impact on manufacturing, healthcare, and research.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to production process of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A device for a production process comprising a formation process, the device comprising:
   a first liquid container configured to contain a first device liquid comprising a first device liquid material, in fluid connection with a first liquid providing device comprising a first device opening;
   a second liquid container configured to contain a second device liquid comprising a second device liquid material, in fluid connection with a second liquid providing device comprising a second device opening;
   a first liquid transporter configured to transport the first device liquid from the first liquid container to the first liquid providing device and through the first device opening; and
   a second liquid transporter configured to transport the second device liquid from the second liquid container to the second liquid providing device to provide a second device liquid jet comprising the second device liquid material through the second device opening, propagating in a direction;
   wherein the first liquid providing device and the second liquid providing device are configured for providing the first device liquid and the second device liquid contacting each other at a contact point, wherein the second liquid providing device comprises a second device face and said second device opening, wherein the first device opening is directed to the second device face to provide the first device liquid to the second device face;
   wherein one or more of the first liquid providing device and the second liquid providing device comprises an actuator comprising an element configured to vibrate; and wherein the element is configured to vibrate at a frequency selected from the range of 0.1 Hz-100 MHz.

2. The device according to claim 1, wherein one or more of a position of the first device opening and a position of the second device opening is controllable, wherein the device further comprises an actuator configured to control one or more of the position of the first device opening and the position of the second device opening.

3. The device according to claim 1, further comprising a fourth liquid container configured to contain a fourth device liquid comprising a fourth device liquid material, in fluid connection with a fourth liquid providing device comprising a fourth device opening, a fourth liquid transporter configured to transport the fourth device liquid from the fourth liquid container to the fourth liquid providing device and through the fourth device opening to provide a fourth device liquid jet, wherein the fourth device opening is directed to a second virtual collision point downstream of said contact point.

4. The device according to claim 1, further comprising a receptor element configured to receive a product of a formation process executed with the device, wherein the device is configured for 3D-printing a 3D-printed object, the device further comprising an actuator configured to move the receptor element, selected from the group consisting of a mold and a substrate, during execution of the formation process.

5. The device according to claim 1, wherein the first device opening is configured to be in physical contact with the second device face.

6. The device according to claim 5, wherein one or more of a position of the first device opening and a position of the second device opening is controllable, wherein the device further comprises an actuator configured to control one or more of the position of the first device opening and the position of the second device opening.

7. The device according to claim 5, further comprising a fourth liquid container configured to contain a fourth device liquid comprising a fourth device liquid material, in fluid connection with a fourth liquid providing device comprising a fourth device opening, a fourth liquid transporter configured to transport the fourth device liquid from the fourth liquid container to the fourth liquid providing device and through the fourth device opening to provide a fourth device liquid jet, wherein the fourth device opening is directed to a second virtual collision point downstream of said contact point.

8. The device according to claim 5, further comprising a receptor element configured to receive a product of a formation process executed with the device, wherein the device is configured for 3D-printing a 3D-printed object, the device further comprising an actuator configured to move the receptor element, selected from the group consisting of a mold and a substrate, during execution of the formation process.

9. The device according to claim 1, further comprising a fourth liquid container configured to contain a fourth device liquid comprising a fourth device liquid material, in fluid connection with a fourth liquid providing device comprising a fourth device opening, a fourth liquid transporter configured to transport the fourth device liquid from the fourth liquid container to the fourth liquid providing device and through the fourth device opening to provide a fourth device liquid jet, wherein the fourth device opening is directed to a second virtual collision point downstream of said contact point.

10. A device for a production process comprising a formation process, the device comprising:
   a first liquid container configured to contain a first device liquid comprising a first device liquid material, in fluid connection with a first liquid providing device comprising a first device opening;
   a second liquid container configured to contain a second device liquid comprising a second device liquid material, in fluid connection with a second liquid providing device comprising a second device opening;
   a first liquid transporter configured to transport the first device liquid from the first liquid container to the first liquid providing device and through the first device opening to provide a first device liquid jet comprising the first device liquid; and a second liquid transporter configured to transport the second device liquid from the second liquid container to the second liquid providing device and through the second device opening to provide a second device liquid jet comprising the second device liquid;

wherein at least one of the first liquid providing device and the second liquid providing device is configured to provide the respective device liquid material as a liquid jet propagating in a direction;

wherein the first liquid providing device and the second liquid providing device are configured for providing the first device liquid and the second device liquid contacting each other at a contact point;

wherein one or more of the first liquid providing device and the second liquid providing device comprises an actuator comprising an element configured to vibrate;

wherein the element is configured to vibrate at a frequency selected from the range of 0.1 Hz-100 MHz;

wherein the first device opening and the second device opening are directed to a virtual collision point in line of sight of both device openings;

wherein the contact point comprises the virtual collision point;

wherein the device is configured to provide one or more of said modulated first device liquid jet and second device liquid jet with the respective jet having a variable width ($W_j$) in a direction perpendicular to a respective jet direction;

wherein the device is configured to provide one or more of said modulated first device liquid jet and second device liquid jet with the respective jet breaking into subunits after a breaking length determined from the respective device opening, and wherein the breaking length is equal to or shorter than a distance from the respective device opening to the virtual collision point.

11. The device according to claim 10, wherein one or more of a position of the first device opening and a position of the second device opening is controllable, wherein the device further comprises an actuator configured to control one or more of the position of the first device opening and the position of the second device opening.

12. The device according to claim 10, further comprising a fourth liquid container configured to contain a fourth device liquid comprising a fourth device liquid material, in fluid connection with a fourth liquid providing device comprising a fourth device opening, a fourth liquid transporter configured to transport the fourth device liquid from the fourth liquid container to the fourth liquid providing device and through the fourth device opening to provide a fourth device liquid jet, wherein the fourth device opening is directed to a second virtual collision point downstream of said contact point.

13. The device according to claim 10 further comprising a receptor element configured to receive a product of a formation process executed with the device, wherein the device is configured for 3D-printing a 3D-printed object, the device further comprising an actuator configured to move the receptor element, selected from the group consisting of a mold and a substrate, during execution of the formation process.

14. A device for a production process comprising a formation process, the device comprising:

a first liquid container configured to contain a first device liquid comprising a first device liquid material, in fluid connection with a first liquid providing device comprising a first device opening;

a second liquid container configured to contain a second device liquid comprising a second device liquid material, in fluid connection with a second liquid providing device comprising a second device opening;

a first liquid transporter configured to transport the first device liquid from the first liquid container to the first liquid providing device and through the first device opening; and a second liquid transporter configured to transport the second device liquid from the second liquid container to the second liquid providing device and through the second device opening;

wherein at least one of the first liquid providing device and the second liquid providing device is configured to provide the respective device liquid material as a liquid jet propagating in a direction;

wherein the first liquid providing device and the second liquid providing device are configured for providing the first device liquid and the second device liquid contacting each other at a contact point;

wherein one or more of the first liquid providing device and the second liquid providing device comprises an actuator comprising an element configured to vibrate;

wherein the element is configured to vibrate at a frequency selected from the range of 0.1 Hz-100 MHz;

wherein one or more of a position of the first device opening and a position of the second device opening is controllable; and wherein the device further comprises an actuator configured to control one or more of the position of the first device opening and the position of the second device opening.

15. The device according to claim 14, further comprising a receptor element configured to receive a product of a formation process executed with the device, wherein the device is configured for 3D-printing a 3D-printed object, the device further comprising an actuator configured to move the receptor element, selected from the group consisting of a mold and a substrate, during execution of the formation process.

16. A device for a production process comprising a formation process, the device comprising:

a first liquid container configured to contain a first device liquid comprising a first device liquid material, in fluid connection with a first liquid providing device comprising a first device opening;

a second liquid container configured to contain a second device liquid comprising a second device liquid material, in fluid connection with a second liquid providing device comprising a second device opening;

a first liquid transporter configured to transport the first device liquid from the first liquid container to the first liquid providing device and through the first device opening to provide a first device liquid jet comprising the first device liquid; and a second liquid transporter configured to transport the second device liquid from the second liquid container to the second liquid providing device and through the second device opening to provide a second device liquid jet comprising the second device liquid;

wherein at least one of the first liquid providing device and the second liquid providing device is configured to provide the respective device liquid material as a liquid jet propagating in a direction;

wherein the first liquid providing device and the second liquid providing device are configured for providing the first device liquid and the second device liquid contacting each other at a contact point, wherein one or more of the first liquid providing device and the second liquid providing device comprises an actuator comprising an element configured to vibrate, and wherein the element is configured to vibrate at a frequency selected from the range of 0.1 Hz-100 MHz;

wherein the first device opening and the second device opening are directed to a virtual collision point in line of sight of both device openings;

wherein the contact point comprises the virtual collision point;

wherein one or more of a position of the first device opening and a position of the second device opening is controllable; and wherein the device further comprises an actuator configured to control one or more of the position of the first device opening and the position of the second device opening.

* * * * *